(12) United States Patent
Li et al.

(10) Patent No.: US 10,958,929 B2
(45) Date of Patent: Mar. 23, 2021

(54) FLEXIBLE REFERENCE PICTURE MANAGEMENT FOR VIDEO ENCODING AND DECODING

(71) Applicant: Microsoft Technology Licensing, LLC, Redmond, WA (US)

(72) Inventors: Bin Li, Beijing (CN); Jizheng Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/689,500

(22) Filed: Nov. 20, 2019

(65) Prior Publication Data
US 2020/0092574 A1 Mar. 19, 2020

Related U.S. Application Data

(63) Continuation of application No. 15/767,992, filed as application No. PCT/CN2015/093985 on Nov. 6, 2015, now Pat. No. 10,531,111.

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/105* (2014.11); *H04N 19/117* (2014.11);
(Continued)

(58) Field of Classification Search
CPC .... H04N 19/513; H04N 19/426; H04N 19/23; H04N 19/105; H04N 19/46;
(Continued)

(56) References Cited

U.S. PATENT DOCUMENTS

2011/0305277 A1* 12/2011 Fu ................ H04N 19/46
375/240.12
2015/0036943 A1* 2/2015 Lin ................ G06T 3/4053
382/264
(Continued)

FOREIGN PATENT DOCUMENTS

CN 101389034 3/2009
CN 103533370 1/2014
(Continued)

OTHER PUBLICATIONS

Notice on Grant of Patent dated May 25, 2020, from Chinese Patent Application No. 201580072178.X, 9 pp.
(Continued)

*Primary Examiner* — Allen C Wong
(74) *Attorney, Agent, or Firm* — Klarquist Sparkman, LLP

(57) ABSTRACT

Innovations in flexible reference picture management are described. For example, a video encoder and video decoder use a global reference picture set ("GRPS") of reference pictures that remain in memory, and hence are available for use in video encoding/decoding, longer than conventional reference pictures. In particular, reference pictures of the GRPS remain available across random access boundaries. Or, as another example, a video encoder and video decoder clip a reference picture so that useful regions of the reference picture are retained in memory, while unhelpful or redundant regions of the reference picture are discarded. Reference picture clipping can reduce the amount of memory needed to store reference pictures or improve the utilization of available memory by providing better options for motion compensation. Or, as still another example, a video encoder and video decoder filter a reference picture to remove random
(Continued)

noise (e.g., capture noise due to camera imperfections during capture).

20 Claims, 17 Drawing Sheets

(51) Int. Cl.
    *H04N 19/46*     (2014.01)
    *H04N 19/117*     (2014.01)
    *H04N 19/142*     (2014.01)
    *H04N 19/146*     (2014.01)
    *H04N 19/17*     (2014.01)
    *H04N 19/179*     (2014.01)
    *H04N 19/82*     (2014.01)
    *H04N 19/58*     (2014.01)
    *H04N 19/426*     (2014.01)
    *H04N 19/23*     (2014.01)

(52) U.S. Cl.
    CPC ......... *H04N 19/142* (2014.11); *H04N 19/146* (2014.11); *H04N 19/17* (2014.11); *H04N 19/179* (2014.11); *H04N 19/23* (2014.11); *H04N 19/426* (2014.11); *H04N 19/46* (2014.11); *H04N 19/58* (2014.11); *H04N 19/82* (2014.11)

(58) Field of Classification Search
    CPC .. H04N 19/117; H04N 19/142; H04N 19/146; H04N 19/17; H04N 19/179; H04N 19/82; H04N 19/58
    USPC .................................................. 375/240.16
    See application file for complete search history.

(56) References Cited

U.S. PATENT DOCUMENTS

| | | | | |
|---|---|---|---|---|
| 2015/0189298 | A1* | 7/2015 | Ye ........................ | H04N 19/16 |
| | | | | 375/240.02 |
| 2015/0350644 | A1* | 12/2015 | Boon .................. | H04N 19/172 |
| | | | | 375/240.12 |
| 2017/0013279 | A1* | 1/2017 | Puri ..................... | H04N 19/527 |

FOREIGN PATENT DOCUMENTS

| | | |
|---|---|---|
| CN | 103765866 | 4/2014 |
| CN | 104919797 | 9/2015 |
| EP | 1956550 | 8/2008 |

OTHER PUBLICATIONS

Notice on the Second Office Action dated Dec. 4, 2019, from Chinese Patent Application No. 201580072178.X, 16 pp.

Zhu et al., "A low complexity macroblock mode decision algorithm for multiview video coding," Journal of Optoelectronics Laser, vol. 25, No. 5, pp. 988-997 (May 2014).

* cited by examiner software 180 implementing one or more innovations for flexible reference picture management

400

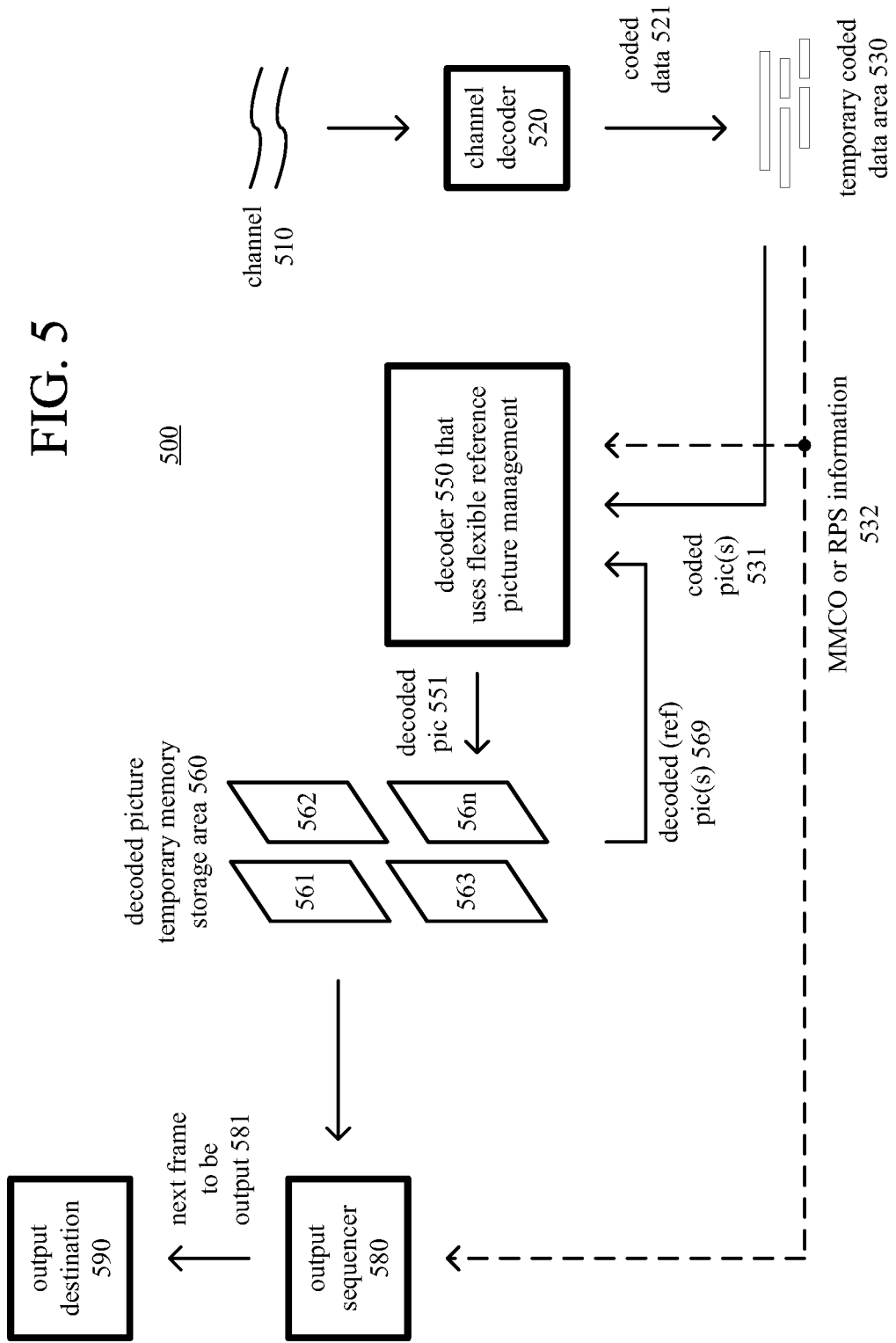

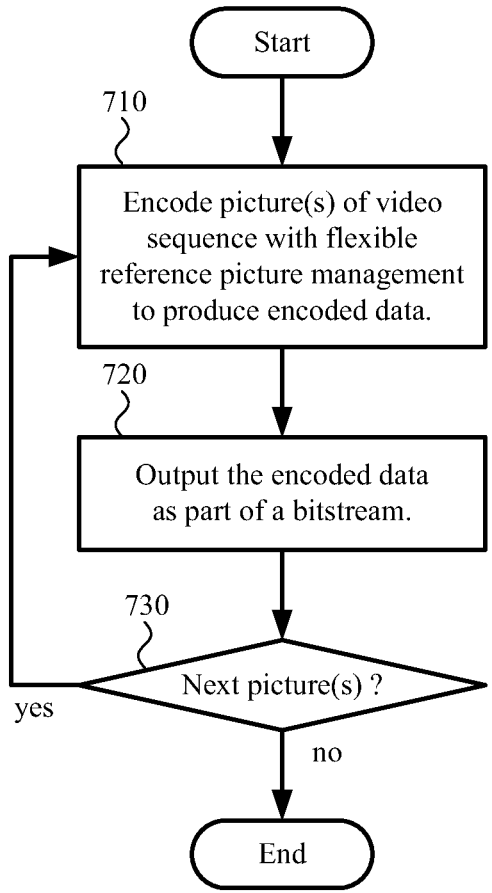
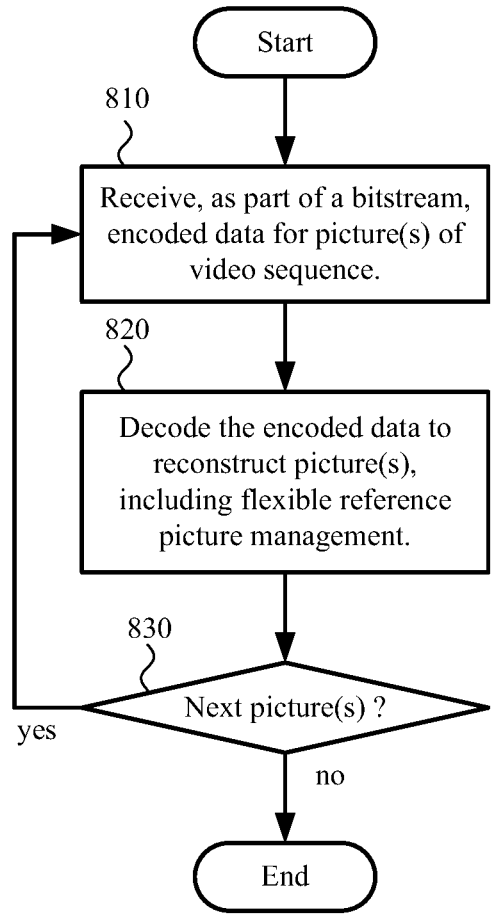
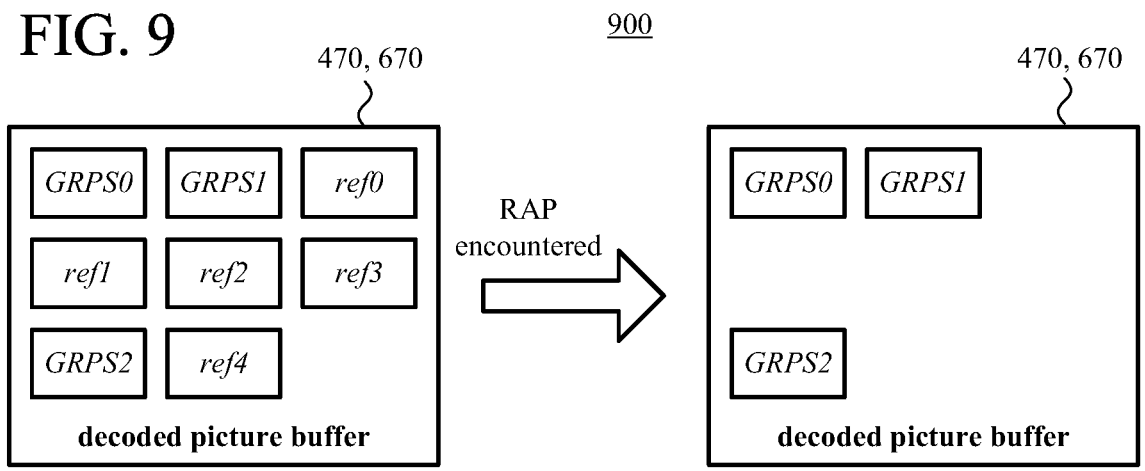

global reference picture set (GRPS), sequence parameter set (SPS), and picture parameter set (PPS) are accessible across the random access (RA) boundary defined at RA picture (RAP)

global reference picture in the GRPS ($GRPS0$) is used as a reference picture for two RAPs ($RAP0_1$ and $RAP2_{61}$); the other RAP ($RAP1_{31}$) is encoded using only intra-picture compression

1100

1200

FIG. 13a  1310    clipping one region
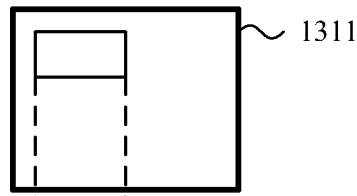
buffer before clipping:
buffer after clipping:
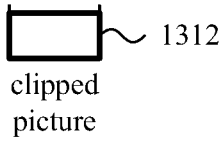
FIG. 13b  1320    clipping two non-overlapping regions
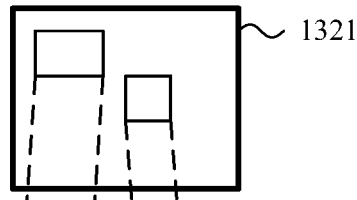
buffer before clipping:
buffer after clipping:
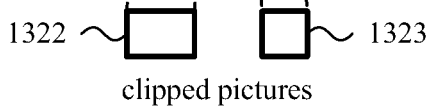

FIG. 13c 1330  clipping two overlapping regions
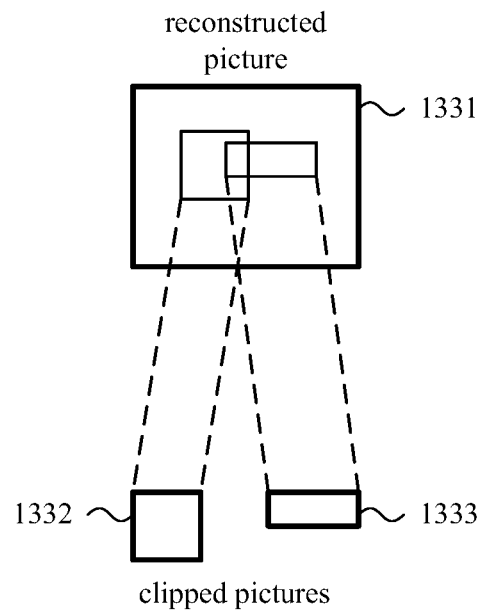
buffer before clipping:
buffer after clipping:
FIG. 13d 1340  clipping and scaling
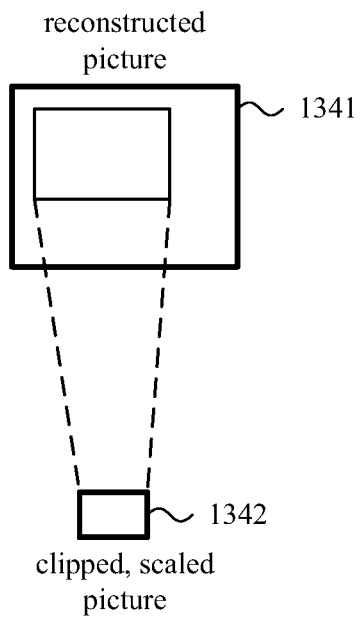
buffer before clipping and scaling:
buffer after clipping and scaling:

FIG. 14
1400 current picture 1410

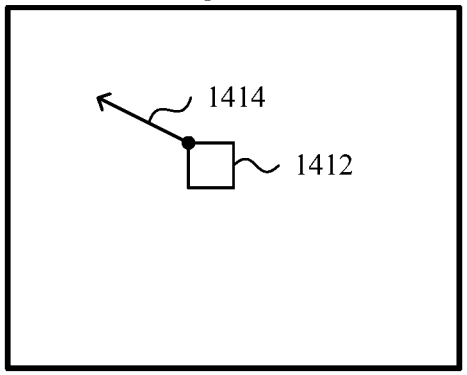

- current block 1412 in the current picture 1410 has top-left corner at (256, 192)
- MV 1414 has value (-127, -66)

reconstructed picture 1420
(original reference picture)

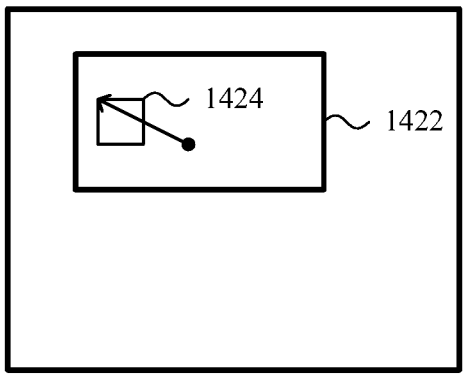

- clipped reference picture 1422 is the rectangle from (96, 64) to (512, 256) of the reconstructed picture 1420
- MV indicates a block 1424 whose top-left corner is (129, 126) in the reconstructed picture 1420: (256, 192) + (-127, -66) = (129, 126)
- MV indicates a block 1424 whose top-left corner is (33, 62) in the clipped reference picture 1422: (256, 192) + (-127, -66) − (96, 64) = (33, 62)

1600 denoising of reference picture in video encoder

1650 denoising of reference picture in video decoder

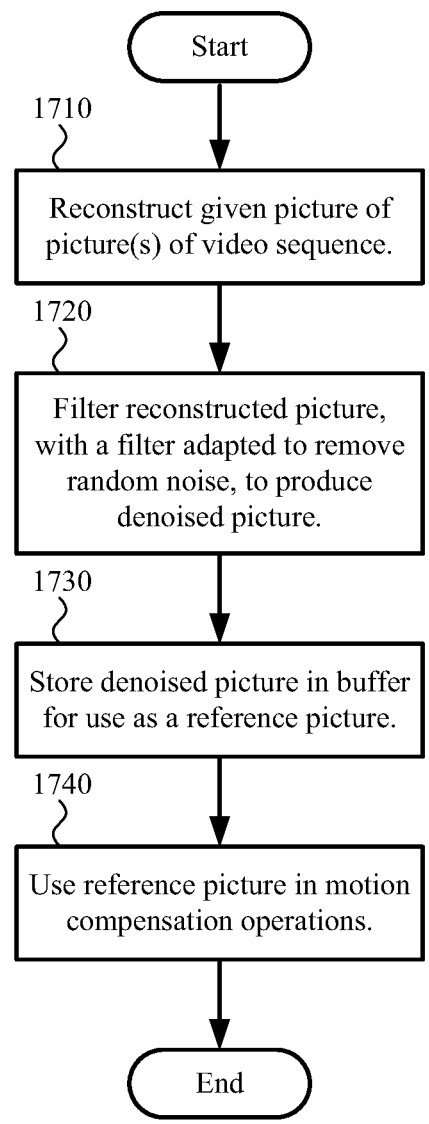

FLEXIBLE REFERENCE PICTURE MANAGEMENT FOR VIDEO ENCODING AND DECODING

CROSS REFERENCE TO RELATED APPLICATIONS

This application is a continuation of U.S. patent application Ser. No. 15/767,992, filed Apr. 12, 2018, which is a U.S. National Stage of International Application No. PCT/CN2015/093985, filed Nov. 6, 2015, which was published in English under PCT Article 21(2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263, H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. A video codec standard typically defines options for the syntax of an encoded video bitstream, detailing parameters in the bitstream when particular features are used in encoding and decoding, in many cases, a video codec standard also provides details about the decoding operations a video decoder should perform to achieve conforming results in decoding. Aside from codec standards, various proprietary codec formats define other options for the syntax of an encoded video bitstream and corresponding decoding operations.

In a typical video sequence, most regions of a given picture are the same, or change only slightly, compared to pictures before the given picture and after the given picture. Most video codec standards and formats use inter-picture prediction to exploit such picture-to-picture redundancy in a video sequence. For example, if a block of sample values in the given picture is predicted using inter-picture prediction, a video encoder estimates the motion of the block relative to one or more other, previously encoded/decoded pictures, which are available for reference when encoding/decoding the given picture. The other, previously encoded/decoded pictures are called reference pictures. When the video encoder finds a matching block within a reference picture for the block of the given picture, the video encoder represents the matching block, e.g., using an identifier of the reference picture and the location of the matching block (relative to the location of the block of the given picture). The video encoder can determine differences between the block of the given picture and the matching block, then encode those differences.

According to some video codec standards and formats, a video encoder and video decoder apply simple rules to determine which reference pictures to retain in a buffer for inter-picture prediction, and to determine which reference pictures to remove from the buffer. According to other video codec standards and formats, a video encoder has more control over which reference pictures to retain or remove from the buffer, and the video encoder signals information to a video decoder so that the video decoder can update reference pictures accordingly. Prior video codec standards and formats are not sufficiently flexible in terms of options for reference picture management, which can hurt coding efficiency and result in inefficient use of resources during video encoding/decoding.

SUMMARY

In summary, the detailed description presents innovations in flexible reference picture management. For example, a video encoder and video decoder use a global reference picture set ("GRPS") of reference pictures that remain in memory, and hence are available for use in video encoding and video decoding, longer than conventional reference pictures. Using a GRPS can improve video coding efficiency by making specially selected reference pictures available throughout video encoding/decoding. Or, as another example, a video encoder and video decoder can clip a reference picture so that useful regions of the reference picture are retained in memory, while unhelpful or redundant regions of the reference picture are discarded. Reference picture clipping can reduce the amount of memory needed to store reference pictures, or it can improve the utilization of available memory by storing a more diverse set of reference pictures. Or, as still another example, a video encoder and video decoder filter a reference picture to remove capture noise (e.g., noise due to camera imperfections during capture). Denoised reference pictures may provide better results in inter-picture prediction, thereby improving video coding efficiency.

According to one aspect of the innovations described herein, a video encoder encodes one or more pictures of a video sequence to produce encoded data, then outputs the encoded data as part of a bitstream. As part of encoding, the video encoder determines a global reference picture that is part of a GRPS. The video encoder encodes the global reference picture to produce encoded data for the global reference picture. The video encoder also encodes other pictures to produce encoded data for the other pictures. The other pictures include at least one picture designated to be a random access picture ("RAP"), which define one or more random access boundaries. The global reference picture is available across the one or more random access boundaries, which can improve coding efficiency.

A corresponding video decoder receives, as part of a bitstream, encoded data for one or more pictures of a video sequence, and decodes the encoded data to reconstruct the picture(s). The encoded data includes encoded data for a global reference picture that is part of a GRPS as well as encoded data for other pictures. The other pictures include at least one picture designated to be a RAP, which define one or more random access boundaries. As part of the decoding, the video decoder decodes the global reference picture. The video decoder also decodes the other pictures. The global reference picture is available across the one or more random access boundaries.

According to another aspect of the innovations described herein, a video encoder encodes one or more pictures of a video sequence to produce encoded data, and outputs the encoded data as part of a bitstream. As part of the encoding, the video encoder reconstructs a given one of the picture(s). The video encoder clips the reconstructed picture according to clipping parameters. In doing so, the video encoder crops at least some regions of the reconstructed picture to produce a clipped picture. The video encoder stores the clipped picture in a buffer for use as a reference picture, then uses the reference picture in motion compensation operations. Clipping of reference pictures can allow the video encoder to reduce the amount of memory used to buffer reference pictures. Or, clipping of reference pictures can allow the video encoder to store a more useful set of reference pictures in a given amount of memory.

A corresponding video decoder receives, as part of a bitstream, encoded data for one or more pictures of a video sequence, then decodes the encoded data to reconstruct the picture(s). As part of the decoding, the video decoder reconstructs a given one of the picture(s). The video decoder clips the reconstructed picture according to clipping parameters. In doing so, the video decoder crops at least some regions of the reconstructed picture to produce a clipped picture. The video decoder stores the clipped picture in a buffer for use as a reference picture, then uses the reference picture in motion compensation operations. Clipping of reference pictures can allow the video decoder to reduce the amount of memory used to buffer reference pictures. Or, clipping of reference pictures can allow the video decoder to store a more useful set of reference pictures in a given amount of memory.

According to another aspect of the innovations described herein, a video encoder encodes one or more pictures of a video sequence to produce encoded data, and outputs the encoded data as part of a bitstream. As part of the encoding, the video encoder reconstructs a given one of the picture(s). The video encoder filters the reconstructed picture, with a filter adapted to remove capture noise, to produce a denoised picture. The video encoder stores the denoised picture in a buffer for use as a reference picture, then uses the reference picture in motion compensation operations. In some example implementations, denoising reference pictures can improve inter-picture prediction, which improves video coding efficiency.

A corresponding video decoder receives, as part of a bitstream, encoded data for one or more pictures of a video sequence, and decodes the encoded data to reconstruct the picture(s). As part of the decoding, the video decoder reconstructs a given one of the picture(s). The video decoder filters the reconstructed picture, with a filter adapted to remove capture noise, to produce a denoised picture. The video decoder stores the denoised picture in a buffer for use as a reference picture, then uses the reference picture in motion compensation operations.

The innovations can be implemented as part of a method, as part of a computing system configured to perform operations for the method, or as part of one or more computer-readable media storing computer-executable instructions for causing a computing system to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 5 is a diagram of an example decoder system in conjunction with which some described embodiments can be implemented.

FIGS. 7 and 8 are flowcharts illustrating generalized techniques for video encoding and video decoding, respectively, that include flexible reference picture management.

FIG. 9 is a diagram illustrating an example of updates to a decoded picture buffer ("DPB") when encoding or decoding uses a global reference picture set ("GRPS").

FIGS. 13a-13e are diagrams illustrating examples of clipping of reference pictures.

FIG. 14 is a diagram illustrating motion compensation involving a clipped reference picture.

FIG. 17 is a flowchart illustrating an example technique for denoising a reference picture during video encoding or video decoding.

DETAILED DESCRIPTION

The detailed description presents innovations in flexible reference picture management. For example, a video encoder and video decoder use a global reference picture set ("GRPS") of reference pictures that remain in memory, and hence are available for use in video encoding and video decoding, longer than conventional reference pictures. Using a GRPS can improve video coding efficiency by making specially selected reference pictures available throughout video encoding and video decoding. Or, as another example, a video encoder and video decoder can clip a reference picture so that useful regions of the reference picture are retained in memory, while unhelpful or redundant regions of the reference picture are discarded. Reference picture clipping can reduce the amount of memory needed to store reference pictures or improve the utilization of available memory by storing a more diverse set of reference pictures. Or, as still another example, a video encoder and video decoder filter a reference picture to remove capture noise (e.g., noise due to camera imperfections during capture). Denoised reference pictures may provide better results in inter-picture prediction, thereby improving video coding efficiency.

Some of the innovations described herein are illustrated with reference to terms specific to the H.265 standard, for extensions or variations of the H.265 standard. The innovations described herein can also be implemented for extensions or variations of other video codec standards or formats (e.g., the VP9 format, H.264 standard), including future video codec standards or formats that permit the use reference pictures for inter-picture prediction.

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. For example, a video encoder and video decoder can use a GRPS in combination with clipping of reference pictures and/or denoising of reference pictures (potentially including clipping or denoising of global reference pictures in the GRPS). Or, as another example, a video encoder and video decoder can use clipping and/or denoising of reference pictures without using a GRPS. Different embodiments use one or more of the described innovations. Some of the innovations described herein address one or more of the problems noted in the background. Typically, a given technique/tool does not solve all such problems.

I. Example Computer Systems.

Figure 1:
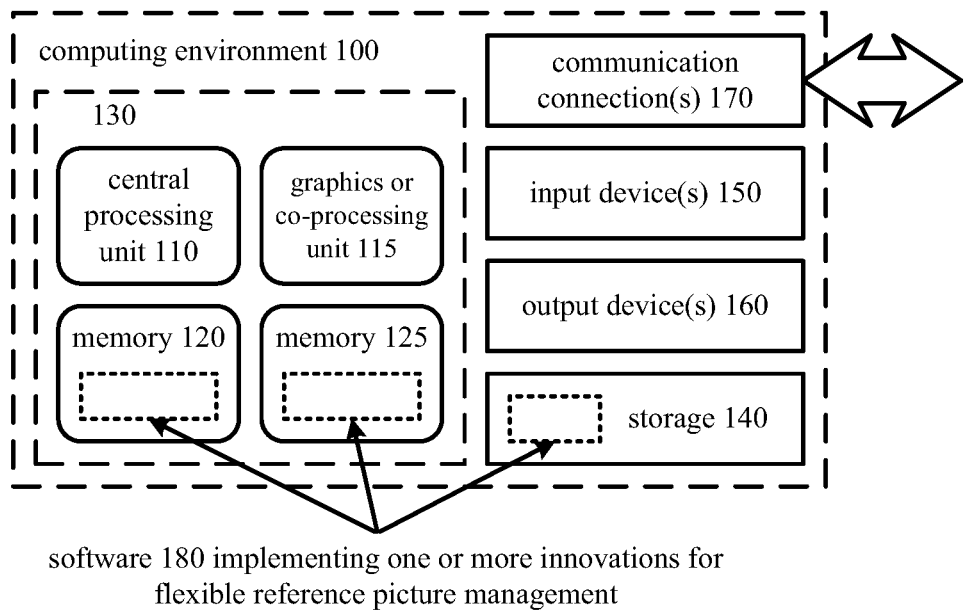
FIG. 1 is a diagram illustrating an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for flexible reference picture management, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic media such as magnetic disks, magnetic tapes or cassettes, optical media such as CD-ROMs or DVDs, or any other medium which can be used to store information and which can be accessed within the computing system (100). The storage (140) stores instructions for the software (180) implementing one or more innovations for flexible reference picture management.

The input device(s) (150) may be a touch input device such as a keyboard, mouse, pen, or trackball, a voice input device, a scanning device, or another device that provides input to the computing system (100). For video, the input device(s) (150) may be a camera, video card, screen capture module, TV tuner card, or similar device that accepts video input in analog or digital form, or a CD-ROM or CD-RW that reads video input into the computing system (100). The output device(s) (160) may be a display, printer, speaker, CD-writer, or other device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations thereof. Thus, the computer-readable media can be, for example, volatile memory, non-volatile memory, optical media, or magnetic media. As used herein, the term computer-readable media does not include transitory signals or propagating carrier waves.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine" and "evaluate" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
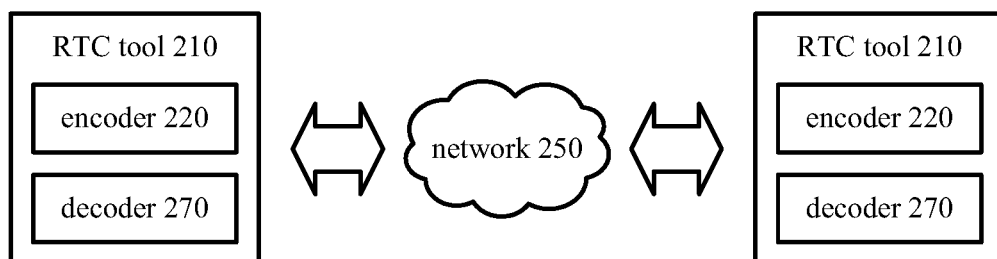
FIGS. 2a and 2b are diagrams illustrating example network environments in which some described embodiments can be implemented.
Figure 2B:
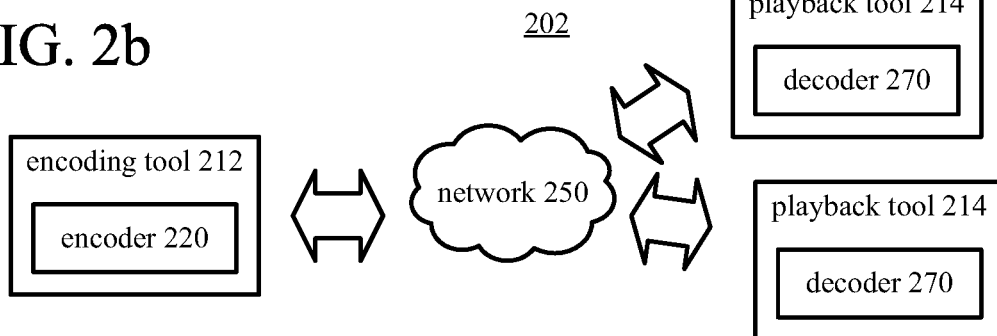

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO/IEC 14496-10 standard (also known as H.264/AVC), another standard, or a proprietary format such as VP8 or VP9, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 3:
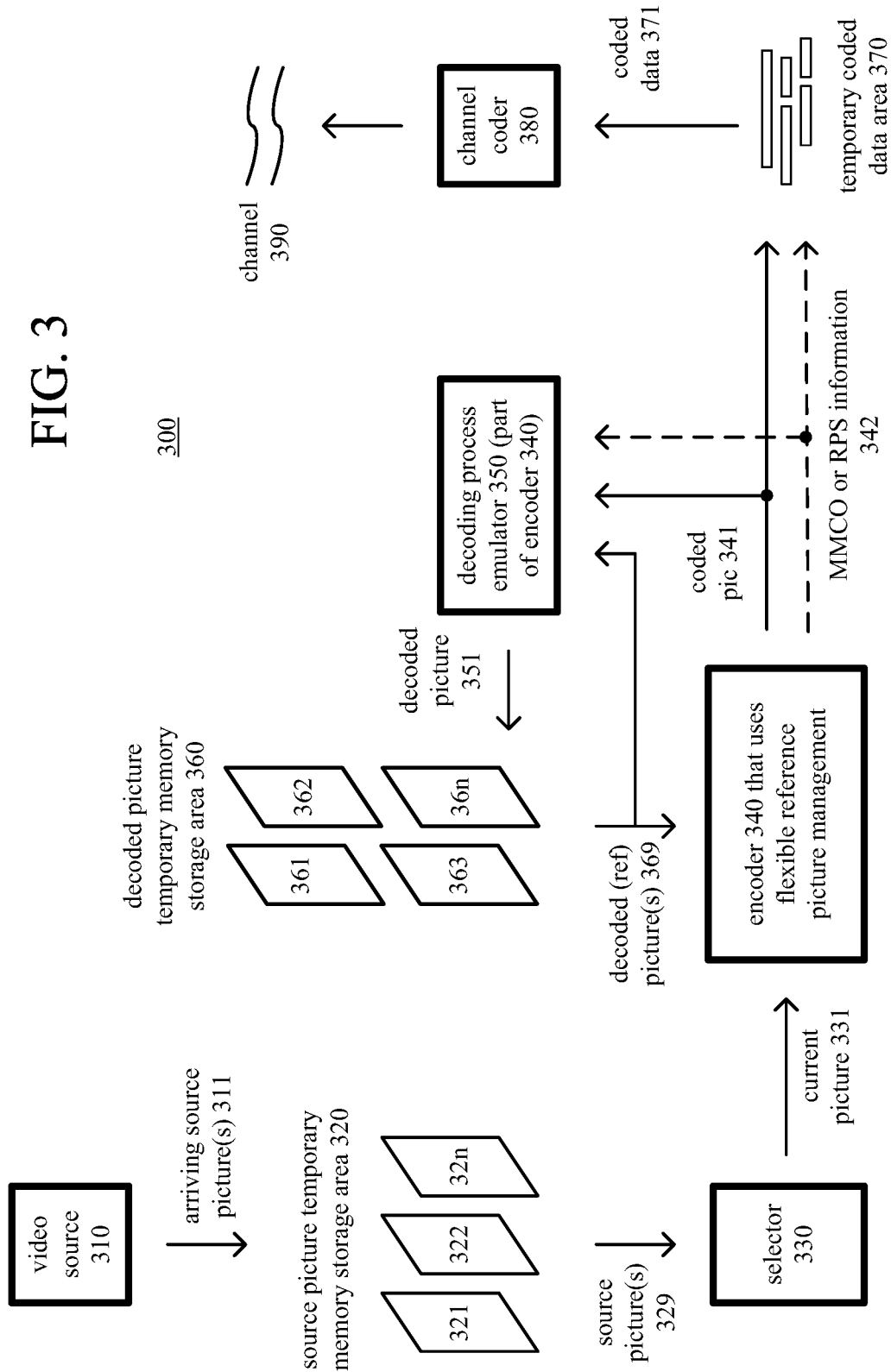
FIG. 3 is a diagram illustrating an example video encoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 5 shows an example decoder system (500) that can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or sharing, wireless screen casting, cloud computing or gaming, or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). A playback tool (214) can include client-side controller logic for managing connections with the encoding tool (212). FIG. 5 shows an example decoder system (500) that can be included in the playback tool (214). Alternatively, the playback tool (214) uses another decoder system.

III. Example Encoder Systems.

FIG. 3 shows an example video encoder system (300) in conjunction with which some described embodiments may be implemented. The video encoder system (300) includes a video encoder (340) with flexible reference picture management, which is further detailed in FIGS. 4a and 4b.

The video encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The video encoder system (300) can be adapted for encoding of a particular type of content. The video encoder system (300) can be implemented as part of an operating system module, as part of an application library, as part of a standalone application, or using special-purpose hardware. Overall, the video encoder system (300) receives a sequence of source video pictures (311) from a video source (310) and produces encoded data as output to a channel (390). The encoded data output to the channel can include content encoded using one or more of the innovations described herein.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, . . . , 32n). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320) to encode as the current picture (331). The order in which pictures are selected by the picture selector (330) for input to the video encoder (340) may differ from the order in which the pictures are produced by the video source (310), e.g., the encoding of some pictures may be delayed in order, so as to allow some later pictures to he encoded first and to thus facilitate temporally backward prediction. Before the video encoder (340), the video encoder system (300) can include a pre-processor (not shown) that performs pre-processing (e.g., filtering) of the current picture (331) before encoding. The pre-processing can include color space conversion into primary (e.g., luma) and secondary (e.g., chroma differences toward red and toward blue) components and resampling processing (e.g., to reduce the spatial resolution of chroma components) for encoding. In general, a pixel is the set of one or more collocated sample values for a location in a picture, which may be arranged in different ways for different chroma sampling formats.

The video encoder (340) encodes the current picture (331) to produce a coded picture (341). As shown M FIGS. 4a and 4b, the video encoder (340) receives the current picture (331) as an input video signal (405) and produces encoded data for the coded picture (341) in a coded video bitstream (495) as output. As part of the encoding, the video encoder (340) in some cases uses one or more features of flexible reference picture management as described herein.

Generally, the video encoder (340) includes multiple encoding modules that perform encoding tasks such as partitioning into tiles, intra-picture prediction estimation and prediction, motion estimation and compensation, frequency transforms, quantization, and entropy coding. Many of the components of the video encoder (340) are used for both intra-picture coding and inter-picture coding. The exact operations performed by the video encoder (340) can vary depending on compression format and can also vary depending on encoder-optional implementation decisions. The format of the output encoded data can be a variation or extension of Windows Media Video format, VC-1 format, MPEG-x format (e.g., MPEG-1, MPEG-2, or MPEG-4), H.26x format (e.g., H.261, H.262, H.263, H.264, H.265), or VPx format, or another format.

Figure 4A:
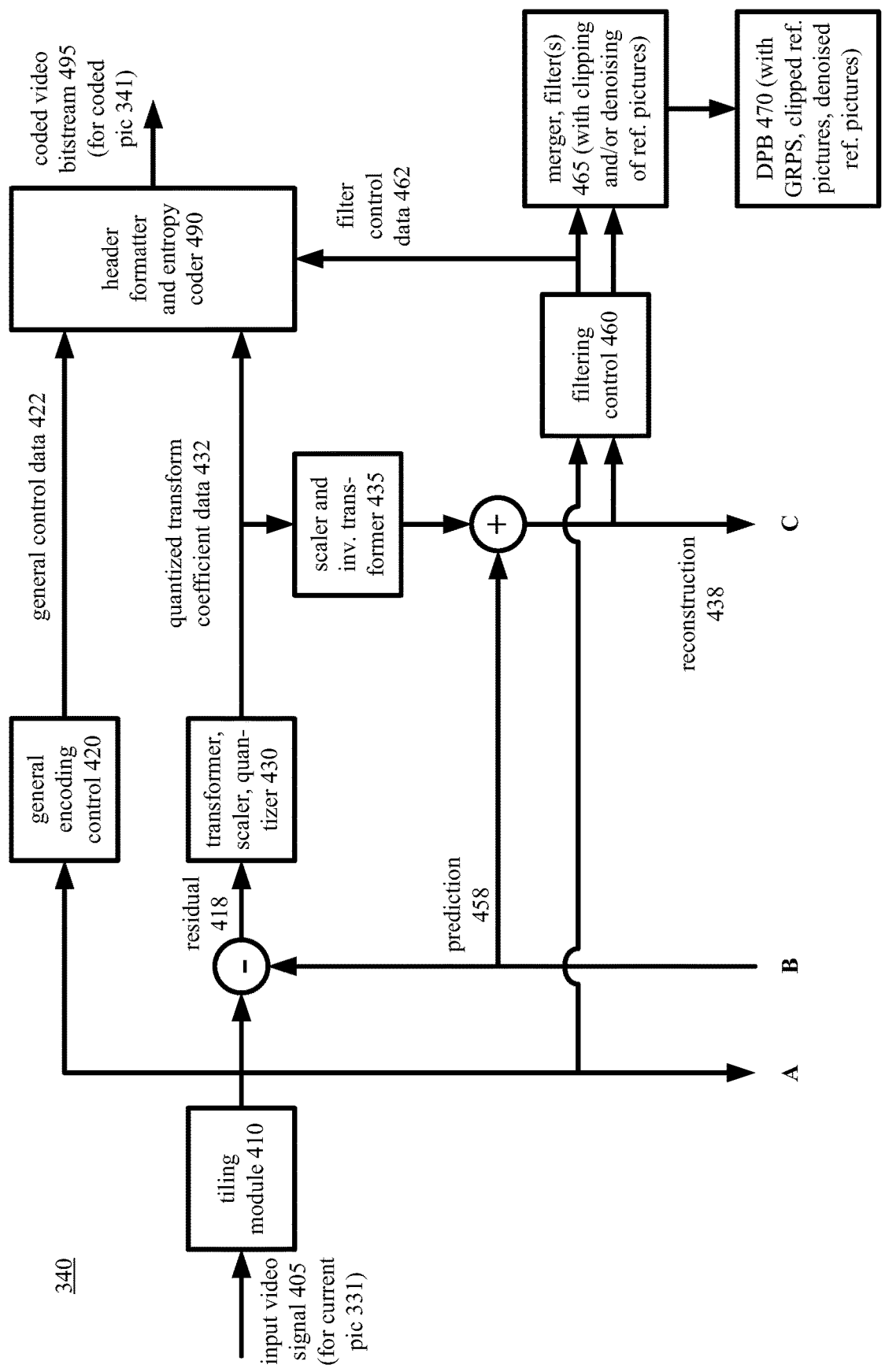
FIGS. 4a and 4b are diagrams illustrating an example video encoder in conjunction with which some described embodiments can be implemented.

As shown in FIG. 4a, the video encoder (340) can include a tiling module (410). With the tiling module (410), the video encoder (340) can partition a picture into multiple tiles of the same size or different sizes. For example, the tiling module (410) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further partitioned into blocks or other sets of sample values for purposes of encoding and decoding. Blocks may be further sub-divided at different stages, e.g., at the prediction, frequency transform and/or entropy encoding stages. For example, a picture can be divided into 64×64 blocks, 32×32 blocks, or 16×16 blocks, which can in turn be divided into smaller blocks of sample values for coding and decoding.

For syntax according to the H.264/AVC standard, the video encoder (340) can partition a picture into one or more slices of the same size or different sizes. The video encoder (340) splits the content of a picture (or slice) into 16×16 macroblocks. A macroblock includes luma sample values organized as four 8×8 luma blocks and corresponding chroma sample values organized as 8×8 chroma blocks. Generally, a macroblock has a prediction mode such as inter or intra. A macroblock includes one or more prediction units (e.g., 8×8 blocks, 4×4 blocks, which may be called partitions for inter-picture prediction) for purposes of signaling of prediction information (such as prediction mode details, motion vector ("MV") information, etc.) and/or prediction processing. A macroblock also has one or more residual data units for purposes of residual coding/decoding.

For syntax according to the H.265/HEVC standard, the video encoder (340) splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the video encoder. A luma CTB can contain, for example, 64×64, 32×32, or 16×16 luma sample values. A CTU includes one or more coding units. A coding unit ("CU") has a luma coding block ("CB") and two corresponding chroma CBs. For example, according to quadtree syntax, a CTU with a 64×64 luma CTB and two 64×64 chroma CTBs (YUV 4:4:4 format) can be split into four CUs, with each CU including a 32×32. luma CB and two 32×32 chroma CBs, and with each CU possibly being split further into smaller CUs according to quadtree syntax. Or, as another example, according to quadtree syntax, a CTU with a 64×64 luma CTB and two 32×32 chroma CTBs (YIN 4:2:0 format) can be split into tour CUs, with each CU including a 32×32 luma CB and two 16×16 chroma CBs, and with each CU possibly being split further into smaller CUs according to quadtree syntax.

In H.265/HEVC implementations, a CU has a prediction mode such as inter or intra. A CU typically includes one or more prediction units for purposes of signaling of prediction information (such as prediction mode details, displacement values, etc.) and/or prediction processing. A prediction unit ("PU") has a luma prediction block ("PB") and two chroma PBs. According to the H.265/HEVC standard, for an intra-picture-predicted CU, the PU has the same size as the CU, unless the CU has the smallest size (e.g., 8×8). In that case, the CU can be split into smaller PUs (e.g., four 4×4 PUs if the smallest CU size is 8×8, for intra-picture prediction) or the PU can have the smallest CU size, as indicated by a syntax element for the CU. For an inter-picture-predicted CU, the CU can have one, two, or four PUs, where splitting into four PUs is allowed only if the CU has the smallest allowable size.

In H.265/HEVC implementations, a CU also typically has one or more transform units for purposes of residual coding/decoding, where a transform unit ("TU") has a luma transform block ("TB") and two chroma TBs. A CU may contain a single TU (equal in size to the CU) or multiple TUs. According to quadtree syntax, a TU can be split into four smaller TUs, which may in turn be split into smaller TUs according to quadtree syntax. The video encoder decides how to partition video into CTUs (CTBs), CUs (CBs), PUs (PBs) and TUs (TBs).

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, residual data CTB, CB, PB or TB, or some other set of sample values, depending on context. The term "unit" can indicate a macroblock, CTU, CU, PU, TU or some other set of blocks, or it can indicate a single block, depending on context.

As shown in FIG. 4a, the video encoder (340) includes a general encoding control (420), which receives the input video signal (405) for the current picture (331) as well as feedback (not shown) from various modules of the video encoder (340). Overall, the general encoding control (420) provides control signals (not shown) to other modules, such as the tiling module (410), transformer/scaler/quantizer (430), scaler/inverse transformer (435), intra-picture prediction estimator (440), motion estimator (450), and intra/inter switch, to set and change coding parameters during encoding. The general encoding control (420) can evaluate intermediate results during encoding, typically considering bit rate costs and/or distortion costs for different options. In particular, the general encoding control (420) decides whether to use intra-picture prediction or inter-picture prediction for the units of the current picture (331). If inter-picture prediction is used for a unit, in conjunction with the motion estimator (450), the general encoding control (420) decides which reference picture(s) to use for the inter-picture prediction. The general encoding control (420) determines which reference pictures to retain (e.g., from a GRPS) in a decoded picture buffer ("DPB") or other buffer. In conjunction with the filtering control (460), the general encoding control (420) determines whether and how to apply clipping and denoising to reference pictures. The general encoding control (420) produces general control data (422) that indicates decisions made during encoding, so that a corresponding decoder can make consistent decisions. For example, the general control data (422) includes information indicating how to update reference pictures retained in the DPB or other buffer. The general control data (422) is provided to the header formatter/entropy coder (490).

Figure 4B:
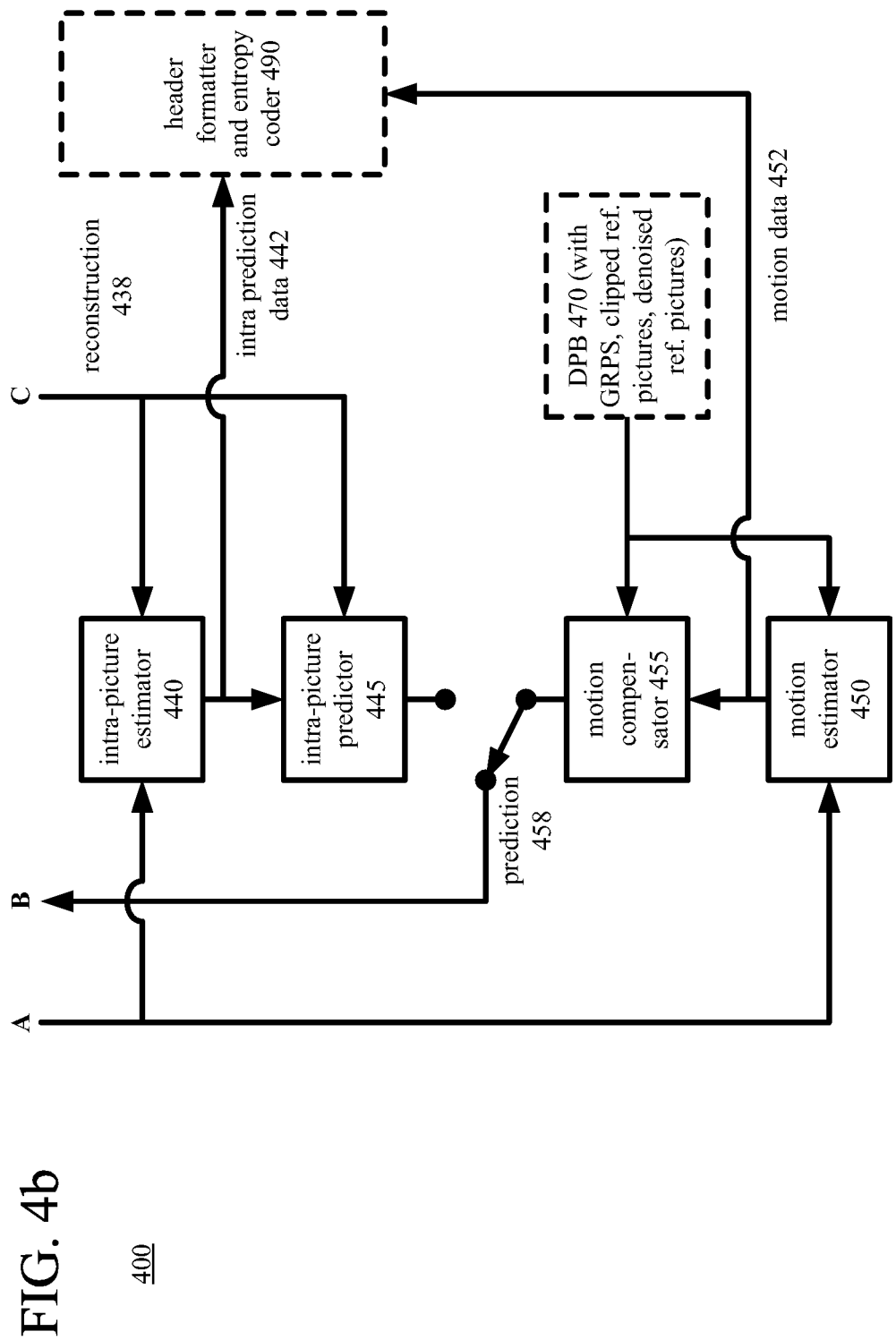

With reference to FIG. 4b, if a unit of the current picture (331) is predicted using inter-picture prediction, a motion estimator (450) estimates the motion of blocks of sample values of the unit with respect to one or more reference pictures. The current picture (331) can be entirely or partially coded using inter-picture prediction. When multiple reference pictures are used, the multiple reference pictures can be from different temporal directions or the same temporal direction. The motion estimator (450) potentially evaluates candidate MVs in a contextual motion mode as well as other candidate MVs. For contextual motion mode, as candidate MVs for the unit, the motion estimator (450) evaluates one or more MVs that were used in motion compensation for certain neighboring units in a local neighborhood or one or more MVs derived by rules. The candidate MVs for contextual motion mode can include MVs from spatially adjacent units, MVs from temporally adjacent units, and MVs derived by rules. Merge mode in the H.265/HEVC standard is an example of contextual motion mode. In some cases, a contextual motion mode can involve a competition among multiple derived MVs and selection of one of the multiple derived MVs. The motion estimator (450) can evaluate different partition patterns for motion compensation for partitions of a given unit of the current picture (331) (e.g., 2N×2N, 2N×N, N×2N, or N×N partitions for PUs of a CU in the H.265/HEVC standard).

The DPB (470), which is an example of decoded picture temporary memory storage area (360) as shown in FIG. 3, buffers one or more reconstructed previously coded pictures for use as reference pictures. At a given time, the DPB (470) can store one or more reference pictures of a GRPS, one or more clipped reference pictures, one or more denoised reference pictures, and/or one or more other reference pictures. Alternatively, the reference picture(s) of a GRPS, clipped reference picture(s), and/or denoised reference picture(s) can be stored in a different buffer.

The motion estimator (450) produces motion data (452) as side information. In particular, the motion data (452) can include information that indicates whether contextual motion mode (e.g., merge mode in the H.265/HEVC standard) is used and, if so, the candidate MV for contextual motion mode (e.g., merge mode index value in the H.265/HEVC standard). More generally, the motion data (452) can include MV data and reference picture selection data. The motion data (452) is provided to the header formatter/entropy coder (490) as well as the motion compensator (455). The motion compensator (455) applies MV(s) for a block to the reconstructed reference picture(s) from the DPB (470) or other buffer. When a clipped reference picture is used, the motion compensator (455) can adjust the location referenced by an MV to compensate for clipping and/or scaling, as described below. For the block, the motion compensator (455) produces a motion-compensated prediction, which is a region of sample values in the reference picture(s) that are used to generate motion-compensated prediction values for the block.

With reference to FIG. 4b, if a unit of the current picture (331) is predicted using intra-picture prediction, an intra-picture prediction estimator (440) determines how to perform intra-picture prediction for blocks of sample values of the unit. The current picture (331) can be entirely or partially coded using intra-picture prediction. Using values of a reconstruction (438) of the current picture (331), for intra spatial prediction, the intra-picture prediction estimator (440) determines how to spatially predict sample values of a block of the current picture (331) from neighboring, previously reconstructed sample values of the current picture (331), e.g., estimating extrapolation of the neighboring reconstructed sample values into the block. Or, for intra block copy mode, the intra-picture prediction estimator (440) determines how to predict sample values of a block of the current picture (331) using an offset (sometimes called a block vector) that indicates a previously encoded/decoded portion of the current picture (331). Intra block copy mode can be implemented as a special case of inter-picture prediction in which the reference picture is the current picture (331), and only previously encoded/decoded sample values of the current picture (331) can be used for prediction. As side information, the intra-picture prediction estimator (440) produces intra prediction data (442), such as the prediction mode/direction used. The intra prediction data (442) is provided to the header formatter/entropy coder (490) as well as the intra-picture predictor (445). According to the intra prediction data (442), the intra-picture predictor (445) spatially predicts sample values of a block of the current picture (331) from neighboring, previously reconstructed sample values of the current picture (331), producing intra-picture prediction values for the block. Or, the intra-picture predictor (445) predicts sample values of the block using intra block copy prediction, using an offset (block vector) for the block.

As shown in FIG. 4b, the intra/inter switch selects whether the predictions (458) for a given unit will be motion-compensated predictions or intra-picture predictions. Intra/inter switch decisions for units of the current picture (331) can be made using various criteria.

The video encoder (340) can determine whether or not to encode and transmit the differences (if any) between a block's prediction values (intra or inter) and corresponding original values. The differences (if any) between a block of the prediction (458) and a corresponding part of the original current picture (331) of the input video signal (405) provide values of the residual (418). If encoded/transmitted, the values of the residual (418) are encoded using a frequency transform (if the frequency transform is not skipped), quantization, and entropy encoding. In some cases, no residual is calculated for a unit. Instead, residual coding is skipped, and the predicted sample values are used as the reconstructed sample values.

With reference to FIG. 4a, when values of the residual (418) are encoded, in the transformer/scaler/quantizer (430), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of values of the residual (418) (or sample value data if the prediction (458) is null), producing blocks of frequency transform coefficients. The transformer/scaler/quantizer (430) can apply a transform with variable block sizes. In this case, the transformer/scaler/quantizer (430) can determine which block sizes of transforms to use for the residual values for a current block. For example, in H.265/HEVC implementations, the transformer/scaler/quantizer (430) can split a TU by quadtree decomposition into four smaller TUs, each of which may in turn be split into four smaller TUs, down to a minimum TU size. TU size can be 32×32, 16×16, 8×8, or 4×4 (referring to the size of the luma TB in the TU). In H.265/HEVC implementations, the frequency transform can be skipped. In this case, values of the residual (418) can be quantized and entropy coded.

With reference to FIG. 4a, in the transformer/scaler/quantizer (430), a scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis, or other basis. The quantization step size can depend on a quantization parameter ("QP"), whose value is set for a picture, tile, slice, and/or other portion of video. When quantizing, transform coefficients, the video encoder (340) can use rate-distortion-optimized quantization ("RDOQ"), which is very time-consuming, or apply simpler quantization rules. The quantized transform coefficient data (432) is provided to the header formatter/entropy coder (490). If the frequency transform is skipped, the scaler/quantizer can scale and quantize the blocks of prediction residual data (or sample value data if the prediction (458) is null), producing quantized values that are provided to the header formatter/entropy coder (490).

As shown in FIGS. 4a and 4b, the header formatter/entropy coder (490) formats and/or entropy codes the general control data (422), quantized transform coefficient data (432), intra prediction data (442), motion data (452), and filter control data (462). The entropy coder of the video encoder (340) compresses quantized transform coefficient values as well as certain side information (e.g., MV information, QP values, mode decisions, parameter choices, clipping parameters, filter parameters). Typical entropy coding techniques include Exponential-Golomb coding, Golomb-Rice coding, context-adaptive binary arithmetic coding ("CABAC"), differential coding, Huffman coding, run length coding, variable-length-to-variable-length ("V2V") coding, variable-length-to-fixed-length ("V2F") coding, Lempel-Ziv ("LZ") coding, dictionary coding, and combinations of the above. The entropy coder can use different coding techniques for different kinds of information, can apply multiple techniques in combination e.g., by applying Exponential-Golomb coding or Golomb-Rice coding as binarization for CABAC), and can choose from among multiple code tables within a particular coding technique.

The video encoder (340) produces encoded data for the coded picture (341) in an elementary bitstream, such as the coded video bitstream (495) shown in FIG. 4a. In FIG. 4a, the header formatter/entropy coder (490) provides the encoded data in the coded video bitstream (495). The syntax of the elementary bitstream is typically defined in a codec standard or format, or extension or variation thereof. For example, the format of the coded video bitstream (495) can be a variation or extension of Windows Media Video format, VC-1 format, MPEG-x format (e.g., MPEG-1, MPEG-2, or MPEG-4), H.26x format (e.g., H.261, H.262, H.263, H.264, H.265), VPx format, or another format. After output from the video encoder (340), the elementary bitstream is typically packetized or organized in a container format, as explained below.

The encoded data in the elementary bitstream includes syntax elements organized as syntax structures. In general, a syntax element can be any element of data, and a syntax structure is zero or more syntax elements in the elementary bitstream in a specified order. In the H.264/AVC standard and H.265/HEVC standard, a NAL unit is a syntax structure that contains (1) an indication of the type of data to follow and (2) a series of zero or more bytes of the data. For example, a NAL unit can contain encoded data for a slice (coded slice). Or, a NAL unit can contain encoded data marking a reference picture for a GRPS. The size of the NAL unit (in bytes) is indicated outside the NAL unit. Coded slice NAL units and certain other defined types of NAL units are termed video coding layer ("VCL") NAL units. An access unit is a set of one or more NAL units, in consecutive bitstream order, containing the encoded data for the slice(s) of a picture, and possibly containing other associated data such as metadata.

For syntax according to the H.264/AVC standard or H.265/HEVC standard, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.264/AVC standard or H265/HEVC standard, a sequence parameter set ("SPS") is a syntax structure that contains syntax elements that may be associated with a sequence of pictures. A bitstream can include a single SPS or multiple SPSs. An SPS is typically signaled separate from other data for the sequence, and a syntax element in the other data indicates which SPS to use. For syntax according to the H.264/AVC standard or H.265/HEVC standard, an SPS or PPS is accessible across a random access boundary defined at a picture designated to be a random access picture ("RAP"). That is, the SPS and PPS are accessible to pictures before the random access boundary in bitstream order and accessible to pictures after the random access boundary in bitstream order. In some example implementations, a GRPS is a syntax structure that contains syntax elements associated with a global reference picture. Like an SPS or PPS, the GRPS is accessible across a random access boundary defined at a picture designated to be a RAP. Unlike a SPS or PPS, the GRPS also has encoded data for a picture associated with it.

As shown in FIG. 3, the video encoder (340) also produces memory management control operation ("MMCO") signals (342) or reference picture set ("RPS") information. The RPS is the set of pictures that may be used for reference in motion compensation for a current picture or any subsequent picture. If the current picture (331) is not the first picture that has been encoded, when performing its encoding process, the video encoder (340) may use one or more previously encoded/decoded pictures (369) that have been stored in a decoded picture temporary memory storage area (360). Such stored decoded pictures (369) are used as reference pictures for inter-picture prediction of the content of the current picture (331). The MMCO/RPS information (342) indicates to a video decoder which reconstructed pictures may be used as reference pictures, and hence should be stored in a picture storage area. The DPH (470) in FIGS. 4a and 4b is an example of decoded picture temporary memory storage area (360).

With reference to FIG. 3, the coded picture (341) and MMCO/RPS information (342) (or information equivalent to the MMCO/RPS information (342), since the dependencies and ordering structures for pictures are already known at the video encoder (340)) are processed by a decoding process emulator (350). The decoding process emulator (350) implements some of the functionality of a video decoder, for example, decoding tasks to reconstruct reference pictures. In a manner consistent with the MMCO/RPS information (342), the decoding process emulator (350) determines whether a given coded picture (341) needs to be reconstructed and stored for use as a reference picture M inter-picture prediction of subsequent pictures to he encoded, and whether any modifications (such as clipping or denoising) should be performed on the reference picture. If a coded picture (341) needs to be stored (and possibly modified), the decoding process emulator (350) models the decoding process that would be conducted by a video decoder that receives the coded picture (341) and produces a corresponding decoded picture (351). In doing so, when the video encoder (340) has used decoded picture(s) (369) that have been stored in the decoded picture storage area (360), the decoding process emulator (350) also uses the decoded picture(s) (369) from the storage area (360) as part of the decoding process.

The decoding process emulator (350) may be implemented as part of the video encoder (340). For example, the decoding process emulator (350) includes certain modules and logic as shown in FIGS. 4a and 4b. During reconstruction of the current picture (331), when values of the residual (418) have been encoded/signaled, reconstructed residual values are combined with the prediction (458) to produce an approximate or exact reconstruction (438) of the original content from the video signal (405) for the current picture (331). (In lossy compression, some information is lost from the video signal (405).)

With reference to FIG. 4a, to reconstruct residual values, in the scaler/inverse transformer (435), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the video encoder (340) combines reconstructed residual values with values of the prediction (458) (e.g., motion-compensated prediction values, intra-picture prediction values) to form the reconstruction (438). When residual values have not been encoded/signaled, the video encoder (340) uses the values of the prediction (458) as the reconstruction (438).

With reference to FIGS. 4a and 4b, for intra-picture prediction, the values of the reconstruction (438) can be fed back to the intra-picture prediction estimator (440) and intra-picture predictor (445). The values of the reconstruction (438) can be used for motion-compensated prediction of subsequent pictures. The values of the reconstruction (438) can be further filtered. A filtering control (460) determines how to perform deblock filtering and sample adaptive offset ("SAO") filtering on values of the reconstruction (438), for the current picture (331). The filtering control (460) can also determine how to clip and/or perform denoising on values of the reconstruction (438) for the current picture (331) as a reference picture, as described below. The filtering control (460) produces filter control data (462), which is provided to the header formatter/entropy coder (490) and merger/filter(s) (465).

In the merger/filter(s) (465), the video encoder (340) merges content from different tiles into a reconstructed version of the current picture. The video encoder (340) selectively performs deblock filtering and SAO filtering according to the filter control data (462) and rules for filter adaptation, so as to adaptively smooth discontinuities across boundaries in the current picture (331). In the merger/filter (s), the video encoder (340) can also clip the current picture (331) and/or perform denoising, as described below. Other filtering (such as de-ringing filtering or adaptive loop filtering ("ALF"); not shown) can alternatively or additionally be applied. Tile boundaries can be selectively filtered or not filtered at all, depending on settings of the video encoder (340), and the video encoder (340) may provide syntax elements within the coded bitstream to indicate whether or not such filtering was applied.

in FIGS. 4a and 4b, the DPB (470) buffers the reconstructed current picture for use in subsequent motion-compensated prediction. More generally, as shown in FIG. 3, the decoded picture temporary memory storage area (360) includes multiple picture buffer storage areas (361, 362, . . . , 36n). In a manner consistent with the MMCO/RPS information (342), the decoding process emulator (350) manages the contents of the storage area (360) in order to identify any picture buffers (361, 362, etc.) with pictures that are no longer needed by the video encoder (340) for use as reference pictures. After modeling the decoding process, the decoding process emulator (350) stores a newly decoded picture (351) in a picture buffer (361, 362, etc.) that has been identified in this manner. In addition to the reconstructed current picture, the decoded picture temporary memory storage area (360) can store one or more global reference pictures of a GRPS, one or more clipped reference pictures, and/or one or more denoised reference pictures.

As shown in FIG. 3, the coded picture (341) and MMCO/RPS information (342) are buffered in a temporary coded data area (370). The coded data that is aggregated in the coded data area (370) contains, as part of the syntax of the elementary bitstream, encoded data for one or more pictures (e.g., global reference pictures of a GRPS, other pictures). The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

Depending on implementation and the type of compression desired, modules of the video encoder system (300) and/or video encoder (340) can be added, omitted, split into multiple modules, combined with other modules, and/or replaced with like modules. In alternative embodiments, encoder systems or encoders with different modules and/or other configurations of modules perform one or more of the described techniques. Specific embodiments of encoder systems typically use a variation or supplemented version of the video encoder system (300). Specific embodiments of video encoders typically use a variation or supplemented version of the video encoder (340). The relationships shown between modules within the video encoder system (300) and video encoder (340) indicate general flows of information in the video encoder system (300) and video encoder (340), respectively; other relationships are not shown for the sake of simplicity. In general, a given module of the video encoder system (300) or video encoder (340) can be implemented by software executable on a CPU, by software controlling special-purpose hardware (e.g., graphics hardware for video acceleration), or by special-purpose hardware (e.g., in an ASIC).

IV. Example Decoder Systems.

FIG. 5 is a block diagram of an example video decoder system (500) in conjunction with which some described embodiments may be implemented. The video decoder system (500) includes a video decoder (550), which is further detailed in FIG. 6.

The video decoder system (500) can be a general-purpose decoding tool capable of operating in any of multiple decoding modes such as a low-latency decoding mode for real-time communication, a transcoding mode, and a higher-latency decoding mode for media playback from a file or stream, or it can be a special-purpose decoding tool adapted for one such decoding mode. The video decoder system (500) can be implemented as part of an operating system module, as part of an application library, as part of a standalone application or using special-purpose hardware. Overall, the video decoder system (500) receives coded data from a channel (510) and produces reconstructed pictures as output for an output destination (590). The received encoded data can include content encoded using one or more of the innovations described herein.

The decoder system (500) includes a channel (510), which can represent storage, a communications connection, or another channel for coded data as input. The channel (510) produces coded data that has been channel coded. A channel decoder (520) can process the coded data. For example, the channel decoder (520) de-packetizes and/or demultiplexes data that has been organized for transmission or storage as a media stream (e.g., according to a media program stream or transport stream format such as ITU-T H.222.0|ISO/IEC 13818-1 or an Internet real-time transport protocol format such as IETF RFC 3550), in which case the channel decoder (520) can parse syntax elements added as part of the syntax of the media transmission stream. Or, the channel decoder (520) separates coded video data that has been organized for storage as a file (e.g., according to a media container format such as ISO/IEC 14496-12), in which case the channel decoder (520) can parse syntax elements added as part of the syntax of the media storage file. Or, more generally, the channel decoder (520) can implement one or more media system demultiplexing protocols or transport protocols, in which case the channel decoder (520) can parse syntax elements added as part of the syntax of the protocol(s). The channel (510) or channel decoder (520) may also include other elements (not shown), e.g., for FEC decoding and analog signal demodulation.

The coded data (521) that is output from the channel decoder (520) is stored in a temporary coded data area (530) until a sufficient quantity of such data has been received. The coded data (521) includes coded pictures (531) and MMCO/RPS information (532). The coded data (521) in the coded data area (530) contain, as part of the syntax of an elementary coded video bitstream, coded data for one or more pictures (e.g., global reference pictures of a GRPS, other pictures). The coded data (521) in the coded data area (530) can also include media metadata relating to the encoded video data (e.g., as one or more parameters in one or more SEI messages or VUI messages).

In general, the coded data area (530) temporarily stores coded data (521) until such coded data (521) is used by the video decoder (550). At that point, coded data for a coded picture (531) and MMCO/RPS information (532) are transferred from the coded data area (530) to the video decoder (550). As decoding continues, new coded data is added to the coded data area (530) and the oldest coded data remaining in the coded data area (530) is transferred to the video decoder (550).

Figure 6:
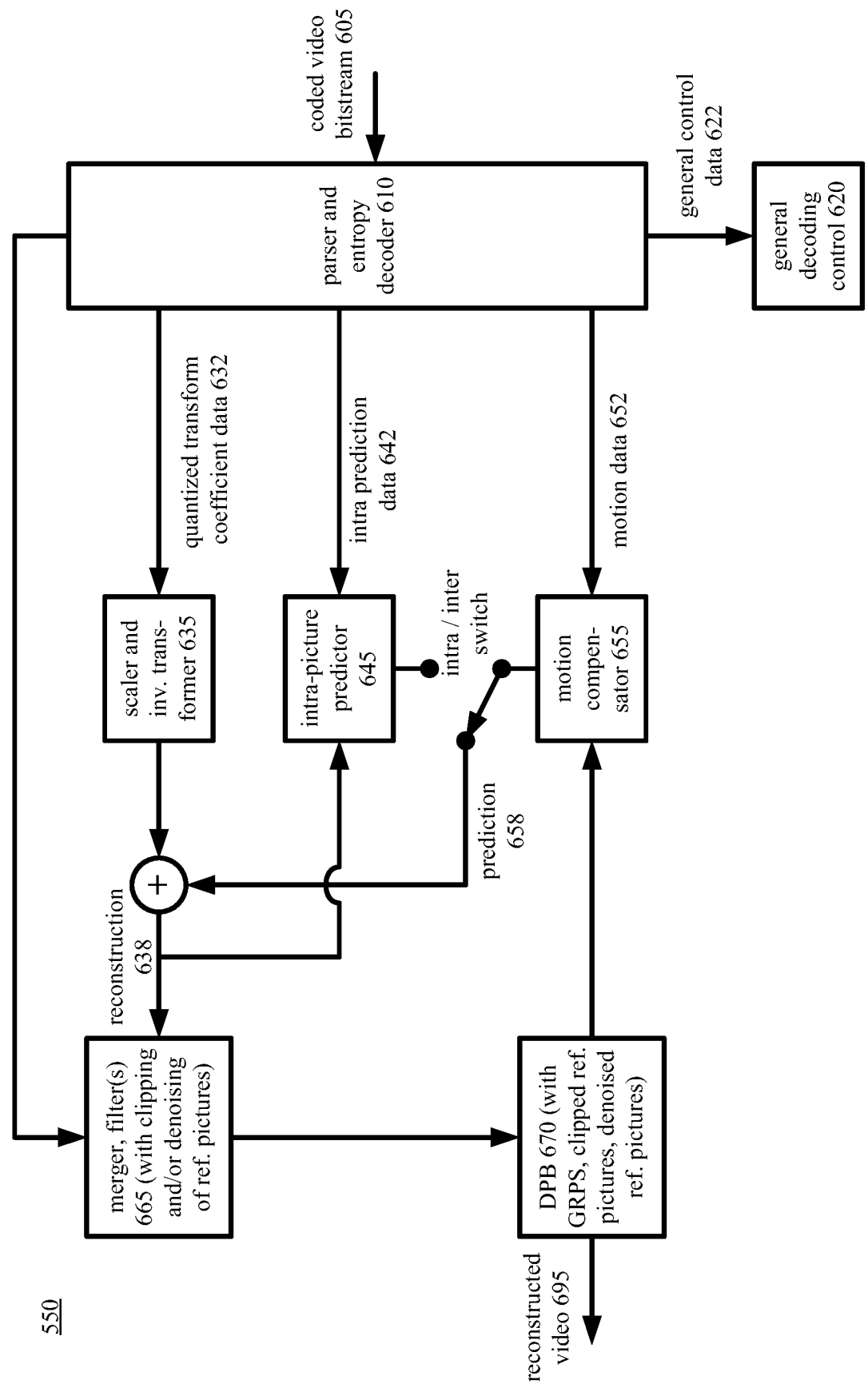
FIG. 6 is a diagram illustrating an example video decoder in conjunction with which some described embodiments can be implemented.

The video decoder (550) decodes a coded picture (531) to produce a corresponding decoded picture (551). As shown in FIG. 6, the video decoder (550) receives the coded picture (531) as input as part of a coded video bitstream (605), and the video decoder (550) produces the corresponding decoded picture (551) as output as reconstructed video (695). As part of the decoding, the video decoder (550) in some cases uses one or more features of flexible reference picture management as described herein.

Generally, the video decoder (550) includes multiple decoding modules that perform decoding tasks such as entropy decoding, inverse quantization, inverse frequency transforms, motion compensation, intra-picture prediction, and filtering. Many of the components of the decoder (550) are used for both intra-picture decoding and inter-picture decoding. The exact operations performed by those components can vary depending on the type of information being decompressed. The format of the coded video bitstream (605) can be a variation or extension of Windows Media Video format, VC-1 format, MPEG-x format (e.g., MPEG-1, MPEG-2, or MPEG-4), H.26x format (e.g., H.261, H.262, H.263, H.264, H.265), or VPx format, or another format.

A picture can be organized into multiple tiles of the same size or different sizes. A picture can also be organized as one or more slices. The content of a slice or tile can be further organized as blocks or other sets of sample values. Blocks may be further sub-divided at different stages. For example, a picture can be divided into 64×64 blocks, 32×32 blocks or 16×16 blocks, which can in turn be divided into smaller blocks of sample values. In implementations of decoding for the H.264/AVC standard, for example, a picture is divided into macroblocks and blocks. In implementations of decoding for the H.265/HEVC standard, for example, a picture is partitioned into CTUs (CTBs), CUs (CBs), PUs (PBs) and TUs (TBs).

With reference to FIG. 6, a buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (340) (e.g., context-adaptive binary arithmetic decoding with binarization using Exponential-Golomb or Golomb-Rice). As a result of parsing and entropy decoding, the parser/entropy decoder (610) produces general control data (622), quantized transform coefficient data (632), intra prediction data (642), motion data (652), and filter control data (662) (e.g., whether and how to apply clipping and denoising to reference pictures).

The general decoding control (620) receives the general control data (622). For example, the general control data (622) includes information indicating which reference pictures to retain (e.g., from a GRPS) in DPB (670). The general decoding control (620) provides control signals (not shown) to other modules (such as the scaler/inverse transformer (635), intra-picture predictor (645), motion compensator (655), and intra/inter switch) to set and change decoding parameters during decoding.

With reference to FIG. 5, as appropriate, when performing its decoding process, the video decoder (550) may use one or more previously decoded pictures (569) as reference pictures for inter-picture prediction. The video decoder (550) reads such previously decoded pictures (569) from a decoded picture temporary memory storage area (560), which is, for example, DPB (670). At a given time, the DPB (670) can store one or more reference pictures of a GRPS, one or more clipped reference pictures, one or more denoised reference pictures, and/or one or more other reference pictures. Alternatively, the reference picture(s) of a GRPS, clipped reference picture(s), and/or denoised reference picture(s) can be stored in a different buffer.

With reference to FIG. 6, if the current picture is predicted using inter-picture prediction, a motion compensator (655) receives the motion data (652), such as MV data, reference picture selection data and merge mode index values. The motion compensator (655) applies MVs to the reconstructed reference picture(s) from the DPB (670) or other buffer. When a clipped reference picture is used, the motion compensator (655) can adjust the location referenced by an MV to compensate for clipping and/or scaling, as described below. The motion compensator (655) produces motion-compensated predictions for inter-coded blocks of the current picture.

in a separate path within the video decoder (550), the intra-picture predictor (645) receives the intra prediction data (642), such as information indicating the prediction mode/direction used. For intra spatial prediction, using values of a reconstruction (638) of the current picture, according to the prediction mode/direction, the intra-picture predictor (645) spatially predicts sample values of a current block of the current picture from neighboring, previously reconstructed sample values of the current picture. Or, for intra block copy mode, the intra-picture predictor (645) predicts the sample values of a current block using previously reconstructed sample values of a reference block, which is indicated by an offset (block vector) for the current block.

The intra/inter switch selects values of a motion-compensated prediction or intra-picture prediction for use as the prediction (658) for a given block. For example, when H.265/HEVC syntax is followed, the intra/inter switch can be controlled based on a syntax element encoded for a CU of a picture that can contain intra-predicted CUs and inter-predicted CUs. When residual values have been encoded/signaled, the video decoder (550) combines the prediction (658) with reconstructed residual values to produce the reconstruction (638) of the content from the video signal. When residual values have not been encoded/signaled, the video decoder (550) uses the values of the prediction (658) as the reconstruction (638).

The video decoder (550) also reconstructs prediction residual values. To reconstruct the residual when residual values have been encoded/signaled, the scaler/inverse transformer (635) receives and processes the quantized transform coefficient data (632). In the scaler/inverse transformer (635), a scaler/inverse quantizer performs inverse scaling and inverse quantization on the quantized transform coefficients. The scaler/inverse transformer (635) sets values for QP for a picture, tile, slice and/or other portion of video based on syntax elements in the bitstream. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof). If the frequency transform was skipped during encoding, the inverse frequency transform is also skipped. In this case, the scaler/inverse quantizer can perform inverse scaling and inverse quantization on blocks of prediction residual data (or sample value data), producing reconstructed values. The video decoder (550) combines reconstructed prediction residual values with prediction values of the prediction (658), producing values of the reconstruction (638).

For intra-picture prediction, the values of the reconstruction (638) can be fed back to the intra-picture predictor (645). For inter-picture prediction, the values of the reconstruction (638) can be further filtered. In the merger/filter(s) (665), the video decoder (550) merges content from different tiles into a reconstructed version of the picture. The video decoder (550) selectively performs deblock filtering and SAO filtering according to the filter control data (662) and rules for filter adaptation, so as to adaptively smooth discontinuities across boundaries in the pictures. In the merger/filter(s), the video decoder (550) can also clip the current picture (as a reference picture) and/or perform denoising, as described below. Other filtering (such as de-ringing filtering or ALF; not shown) can alternatively or additionally be applied. Tile boundaries can be selectively filtered or not filtered at all, depending on settings of the video decoder (550) or a syntax element within the encoded bitstream data. The DPB (670) buffers the reconstructed current picture for use as a reference picture in subsequent motion-compensated prediction. In addition to the reconstructed current picture, the DPB (670) can store one or more global reference pictures of a GRPS, one or more clipped reference pictures, and/or one or more denoised reference pictures. Alternatively, the global reference picture(s) of the GRPS, the clipped reference picture(s), and/or the denoised reference picture(s) can be stored in another buffer.

The video decoder (550) can also include a post-processing filter. The post-processing filter can include deblock filtering, de-ringing filtering, adaptive Wiener filtering, film-grain reproduction filtering, SAO filtering or another kind of filtering. Whereas "in-loop" filtering is performed on reconstructed sample values of pictures in a motion compensation loop, and hence affects sample values of reference pictures, the post-processing filter is applied to reconstructed sample values outside of the motion compensation loop, before output for display.

With reference to FIG. 5, the decoded picture temporary memory storage area (560) includes multiple picture buffer storage areas (561, 562, ..., 56n). The decoded picture storage area (560) is, for example, the DPB (670). The decoder (550) uses the MMCO/RPS information (532) to identify a picture buffer (561, 562, etc.) in which it can store a decoded picture (551). The decoder (550) stores the decoded picture (551) in that picture buffer. In a manner consistent with the MMCO/RPS information (532), the decoder (550) also determines whether to remove any reference pictures from the multiple picture buffer storage areas (561, 562, ..., 56n). After modifications (such as clipping or denoising) of reference pictures by the merger/filter(s) (665), the multiple picture buffer storage areas (561, 562, ..., 56n) can include clipped reference pictures and/or denoised reference pictures, as well as reference pictures of the GRPS.

An output sequencer (580) identifies when the next picture to he produced in display order (also called output order) is available in the decoded picture storage area (560). When the next picture (581) to be produced in display order is available in the decoded picture storage area (560), it is read by the output sequencer (580) and output to the output destination (590) (e.g., display). In general, the order in which pictures are output from the decoded picture storage area (560) by the output sequencer (580) (display order) may differ from the order in which the pictures are decoded by the decoder (550) (bitstream order).

Depending on implementation and the type of decompression desired, modules of the video decoder system (500) and/or video decoder (550) can be added, omitted, split into multiple modules, combined with other modules, and/or replaced with like modules. In alternative embodiments, decoder systems or decoders with different modules and/or other configurations of modules perform one or more of the described techniques. Specific embodiments of decoder systems typically use a variation or supplemented version of the video decoder system (500). Specific embodiments of video decoders typically use a variation or supplemented version of the video decoder (550). The relationships shown between modules within the video decoder system (500) and video decoder (550) indicate general flows of information in the video decoder system (500) and video decoder (550), respectively; other relationships are not shown for the sake of simplicity. In general, a given module of the video decoder system (500) or video decoder (550) can be implemented by software executable on a CPU, by software controlling special-purpose hardware (e.g., graphics hardware for video acceleration), or by special-purpose hardware (e.g., in an ASIC).

V. Flexible Reference Picture Management.

This section describes innovations in flexible reference picture management. For example, the innovations include use of a global reference picture set ("GRPS") during video encoding/decoding, clipping of reference pictures during video encoding/decoding, and/or denoising of reference pictures during video encoding/decoding. In some cases (e.g., use of a GRPS, denoising of reference pictures), the innovations can improve coding efficiency by providing better reference pictures for inter-picture prediction. In other cases (e.g., clipping of reference pictures), the innovations can reduce the amount of memory used to store reference pictures during video encoding/decoding, saving computing resources.

A. Flexible Reference Picture Management, Generally.

FIG. 7 shows a generalized technique (700) for video encoding that includes flexible reference picture management. A video encoder system (such as the video encoder system (300) described with reference to FIG. 3 or another video encoder system) performs the technique (700).

The video encoder system encodes (710) one or more pictures of a video sequence to produce encoded data. As part of the encoding, the video encoder system uses one or more features of flexible reference picture management. For example, the video encoder system uses a GRPS during encoding (see section V.B and, for example, FIG. 11), performs clipping of reference pictures during encoding (see section V.C and, for example, FIG. 15), and/or performs denoising of reference pictures during encoding (see section V.D and, for example, FIG. 17).

The video encoder system outputs (720) the encoded data as part of a bitstream, The encoded data can include encoded data for the picture(s) of the video sequence as well as control data for features of flexible reference picture management, as described below. The video encoder system checks (730) whether to continue by encoding one or more next pictures in the video sequence and, if so, encodes (710) the next picture(s).

The technique (700) shown in FIG. 7 can be performed as a method by a computer system. Or, a computer system can include a video encoder configured to perform video encoding operations for the technique (700) shown in FIG. 7, and further include a buffer configured to store the part of the bitstream. Or, one or more computer-readable media can store computer-executable instructions for causing a computer system programmed thereby to perform video encoding operations for the technique (700) shown in FIG. 7. One or more computer-readable media can store the encoded data produced by the technique (700) shown in FIG. 7.

FIG. 8 shows a corresponding generalized technique (800) for video decoding that includes flexible reference picture management. A video decoder system (such as the video decoder system (500) described with reference to FIG. 5 or another video decoder system) performs the technique (800).

The video decoder system receives (810), as part of a bitstream, encoded data for one or more pictures of a video sequence. The encoded data can include encoded data for the picture(s) of the video sequence as well as control data for features of flexible reference picture management, as described below.

The video decoder system decodes (820) the encoded data to reconstruct the picture(s) of the video sequence. As part of the decoding, the video decoder system uses one or more features of flexible reference picture management. For example, the video decoder system uses a GRPS during decoding (see section V.B and, for example, FIG. 12), performs clipping of reference pictures during decoding (see section V.C and, for example, FIG. 15), and/or performs denoising of reference pictures during decoding (see section V.D and, for example, FIG. 17). The video decoder system checks (830) whether to continue by decoding one or more next pictures in the video sequence and, if so, receives (810) encoded data for the next picture(s).

The technique (800) shown in FIG. 8 can be performed as a method by a computer system. Or, a computer system can include a video decoder configured to perform video decoding operations for the technique (800) shown in FIG. 8, and further include a buffer configured to store the part of the bitstream. Or, one or more computer-readable media can store computer-executable instructions for causing a computer system programmed thereby to perform video decoding operations for the technique (800) shown in FIG. 8. One or more computer-readable media can store encoded data configured for decoding by a video decoder with video decoding operations for the technique (800) shown in FIG. 8.

B. Global Reference Picture Set.

This section describes innovations in use of a GRPS during video encoding and video decoding. For example, a video encoder and video decoder use a GRPS of reference pictures that remain in memory, and hence are available for use in video encoding and video decoding, longer than conventional reference pictures. Using a GRPS can improve video coding efficiency by making specially selected, global reference pictures available throughout video encoding and video decoding.

1. Introduction to GRPS.

In many video codec standards and formats, a video sequence may include a picture designated to be a random access picture ("RAP"). Conventionally, a picture designated to be a RAP is encoded using only intra-picture coding, without any inter-picture prediction. Correct decoding can start at the designated RAP. Pictures after the designated RAP in bitstream order (also called coding order or decoding order) and display order do not rely on reference pictures before the designated RAP in bitstream order. Aside from a few exceptions, pictures encoded/decoded after the designated RAP do not rely on reference pictures encoded/decoded before the designated RAP. (In some codec standards, a picture after the designated RAP in bitstream order but before the designated RAP in display order might rely on an earlier reference picture, but such a picture is typically dropped upon random access.) When a video decoder detects a picture designated to be a RAP, the video decoder typically removes all reference pictures from its DPB. While encoding/decoding with conventional RAPs facilitates various features in playback (e.g., error recovery, channel switching, switching between streams of different bitrates), RAPs are difficult to compress efficiently, since inter-picture prediction is not used.

For syntax according to the H.264 standard or H.265 standard, a picture parameter set ("PPS") contains syntax elements that may be associated with a picture. A PPS can be used for a single picture, or a PPS can be reused for multiple pictures in a sequence. Similarly, for syntax according to the H.264 standard or H.265 standard, a sequence parameter set ("SPS") contains syntax elements that may be associated with a sequence of pictures. Generally, an SPS or PPS remains active during encoding or decoding until it is replaced with another SPS or PPS. Unlike a reference picture, an SPS or PPS remains active across a random access boundary at a designated RAP. That is, a picture encoded/decoded after the designated RAP in bitstream order can still use an SPS or PPS from before the designated RAP in bitstream order. If an SPS or PPS is unavailable when the video decoder detects a designated RAP, the video decoder can skim the bitstream for the SPS or PPS, or the video decoder can request re-transmission of the SPS or PPS. To make it easier to locate the SPS or PPS, the SPS or PPS may be repeated periodically in the bitstream.

For example, a bitstream of encoded data can be organized as follows:

$$SPS0, PPS0, RAP0_0, P_1, \ldots, P_{29}, RAP1_{30},$$
$$P_{31}, \ldots, P_{59}, RAP2_{60}, P_{61}, \ldots$$

where SPS0 indicates a first SPS (which may be followed in the bitstream by a second SPS SPS1, a third SPS SPS2, and so on), and PPS0 indicates a first PPS (which may be followed in the bitstream by a second PPS PPS1, a third PPS PPS2, and so on). $RAP0_0$, $RAP1_{30}$, and $RAP2_{60}$ indicate designated RAPs that appear every 30 pictures. $RAP0_0$ is a first RAP, $RAP1_{30}$ is a second RAP, $RAP2_{60}$ is a third RAP, and so on. $P_1$, $P_2$, . . . indicate pictures encoded using inter-picture prediction relative to one or more reference pictures. The bitstream order for the units of encoded data is the order shown for the units. For pictures that are to be decoded and displayed, the display order is indicated by subscript values. For example, $RAP1_{30}$ is the second RAP, and its display order is 30. Some units of encoded data (e.g., for an SPS or PPS) are not displayed. In this example, when a designated RAP is detected, the video decoder removes all reference pictures from its DPB. Thus, the chain of reference pictures is truncated at the designated RAP. A picture $P_n$ after the designated RAP in bitstream order cannot reference any picture before the designated RAP in bitstream order. On the other hand, SPS0 and PPS0 remain active until replaced during decoding, even after the video decoder detects a designated RAP.

According to innovations described in this section, a GRPS includes one or more global reference pictures. Like an SPS or PPS, a global reference picture of the GRPS is globally available regardless of random access boundaries at designated RAPs. Detection of a designated RAP does not cause removal of global reference picture(s) of the GRPS from the DPB or other buffer. Rather, the global reference picture(s) of the GRPS remain available for use as reference pictures after the video decoder encounters a designated RAP. In some example implementations, a designated RAP can use a global reference picture of the GRPS as a reference picture in inter-picture prediction, which makes encoding of the designated RAP much more efficient. Thus, the GRPS can be integrated into video encoding/decoding to support random access while also improving the coding efficiency for designated RAPs.

2. Example Uses of GRPS.

FIG. 9 shows an example (900) of updates to a DPB (470, 670) when video encoding or video decoding uses a GRPS. At some point during the middle of video encoding/decoding, the DPB (470, 670) includes three global reference pictures (GRPS0, GRPS1, GRPS2) of the GRPS as well as five regular reference pictures (ref0, . . . , ref4). GRPS0 is a first GRPS, GRPS1 is a second GRPS, GRPS2 is a third GRPS, and so on. A GRPS may be displayed (in which case it includes a subscript in the examples below) or not displayed (in which case it lacks a subscript in the examples below). When a designated RAP is encountered, the video encoder or video decoder removes the five regular reference pictures (ref0, ..., ref4) from the DPB (470, 670). The DPB (470, 670) retains the three global reference pictures (GRPS0, GRPS1, GRPS2) of the GRPS, however. Thus, the three global reference pictures (GRPS0, GRPS1, GRPS2) remain accessible across the RAP boundary defined by the designated RAP. The designated RAP can use any of the three global reference pictures (GRPS0, GRPS1, GRPS2) as reference pictures. Even a picture after the designated RAP in bitstream order and display order can use any of the three global reference pictures (GRPS0, GRPS1, GRPS2) as reference pictures.

FIG. 9 shows global reference pictures in the DPB (470, 670), which also stores other, regular reference pictures. Alternatively, the global reference pictures of a GRPS are stored separately. For example, the global reference pictures are stored in a separate buffer for the GRPS. Storing global reference pictures in a separate buffer can simplify management of the global reference pictures.

A video encoder determines when to add a global reference picture to the GRPS. The global reference picture can be an actual picture in a video sequence, which is to be decoded and displayed. Or, the global reference picture can be a virtual picture, generated from pictures of the video sequence or artificially created, which is to be decoded and used in inter-picture prediction, but not displayed. Section V.B.4 describes various approaches to making decisions when determining a global reference picture that is part of a GRPS. The video encoder encodes the global reference picture and marks encoded data for the global reference picture as being part of a GRPS. For example, a NAL unit type marks a GRPS unit in a bitstream. Alternatively, encoded data for a global reference picture of the GRPS is marked with some other indicator. A video decoder decodes and buffers the global reference picture.

FIGS. 10*a*-10*d* show example sequences (1010, 1020, 1030, 1040) of units of encoded data, including GRPS units, in bitstreams. The bitstream order for the units of encoded data is the order shown for the units in FIGS. 10*a*-10*d*. For pictures that are to be decoded and displayed, the display order is indicated by subscript values. Some units of encoded data (e.g., for an SPS or PPS, for a global reference picture of a GRPS in some cases) are not displayed. Thus, for pictures that are to be decoded but not displayed (e.g., some GRPSs), no subscript value is shown in FIGS. 10*a*-10*d*. In some cases, the bitstream order is different than the display order (e.g., due to bidirectional prediction or backward prediction in motion compensation). For example, in FIGS. 10*a* and 10*b*, several pictures ($P_{59}$, $P_{60}$) are earlier in display order than a designated RAP ($RAP2_{61}$), but later in bitstream order than the designated RAP ($RAP2_{61}$).

Figure 10A:
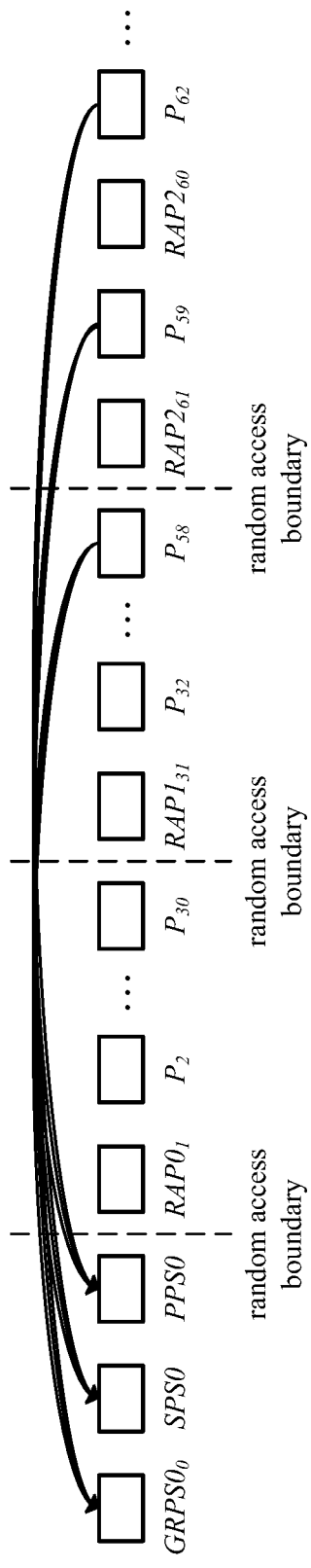
FIGS. 10a-10d are diagrams illustrating example sequences of units of encoded data, including GRPS units, in bitstreams.

In FIG. 10*a*, the example sequence (1010) includes encoded data for a global reference picture ($GRPS0_0$) of a GRPS, an SPS (SPS0), and a PPS (PPS0). The example sequence (1010) also includes encoded data for three designated RAPS ($RAP0_1$, $RAP1_{31}$, $RAP2_{61}$), which appear every 30 pictures, and which define random access boundaries, along with encoded data for other pictures ($P_n$). The GRPS, SPS, and PPS are accessible across random access boundaries defined at the designated RAPS. For example, in FIG. 10*a*, the third designated RAP ($RAP2_{61}$) defines a random access boundary. $GRPS0_0$, SPS0, and PPS0 are accessible to a picture ($P_{58}$) before the third designated RAP ($RAP2_{61}$) in bitstream order and display order, accessible to a picture ($P_{59}$) before the third designated RAP ($RAP2_{61}$) in display order but after it in bitstream order, and accessible to a picture ($P_{62}$) after the third designated RAP ($RAP2_{61}$) in bitstream order and display order. Thus, the global reference picture ($GRPS0_0$) has characteristics of a parameter set (accessible across random access boundaries, which means the global reference picture can be shared by pictures in different random access periods) and characteristics of a regular picture (includes encoded data in the bitstream for the content of an individual, decodable picture).

A video encoder and video decoder can use a reference picture identifier ("ID") to identify a global reference picture of a GRPS. When another picture uses the global reference picture of the GRPS for inter-picture prediction, the other picture uses the reference picture ID to locate the global reference picture in a buffer. The video encoder and video decoder can use a separate set of reference picture IDs for global reference pictures of a GRPS (that is, global reference picture IDs). For example, each global reference picture in the GRPS is assigned a unique global reference picture ID. Alternatively, the video encoder and video decoder can use the same set of reference picture IDs for global reference pictures and other, regular reference pictures.

The video encoder and video decoder can incorporate global reference pictures into existing processes for using reference pictures in motion compensation operations. For example, the video encoder/decoder constructs a reference picture set and one or more reference picture lists. For a given picture to be decoded, a current reference picture set includes pictures available for reference in motion compensation operations for the given picture and any picture later than the given picture in bitstream order. When a GRPS is used, the current reference picture set includes one or more global reference pictures. Then, the video encoder/decoder constructs one or more reference picture lists from the current reference picture set. A reference picture list includes pictures at can be used for reference in motion compensation operations for the given picture or part thereof (e.g., for a slice).

Figure 10B:
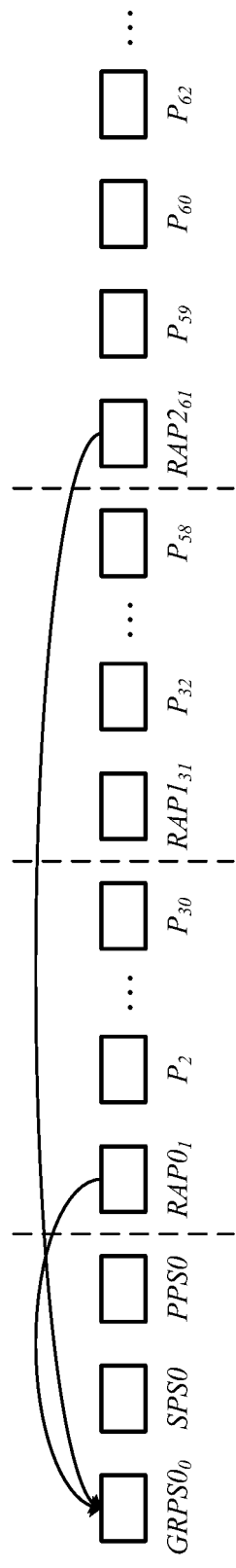

In some example implementations, a designated RAP can be encoded using intra-picture coding or using inter-picture prediction with one or more global reference pictures of a GRPS. FIG. 10*b* shows another example sequence (1020) of units of encoded data, including a GRPS unit, in a bitstream. In this example sequence (1020), two of the designated RAPs ($RAP0_1$ and $RAP2_{61}$) are encoded using inter-picture prediction from the global reference picture ($GRPS0_0$) of the GRPS. The other designated RAP ($RAP1_{31}$) is encoded using intra-picture coding. Encoding designated RAPs with inter-picture prediction from global reference pictures of a GRPS can dramatically reduce the amount of bits used to encode the designated RAPs. The cost for the improved coding efficiency is dependency on the global reference picture, which is decoded and buffered to make it available for subsequent decoding.

If a global reference picture is not available for inter-picture prediction of a designated RAP or other picture, the video decoder can skim locally available parts of the bitstream to find encoded data for the global reference picture, then decode and buffer the global reference picture. Or, the video decoder can request re-transmission of the global reference picture during streaming, then decode and buffer the global reference picture. These operations can add delay to decoding that uses a global reference picture for inter-picture prediction.

Figure 10C:
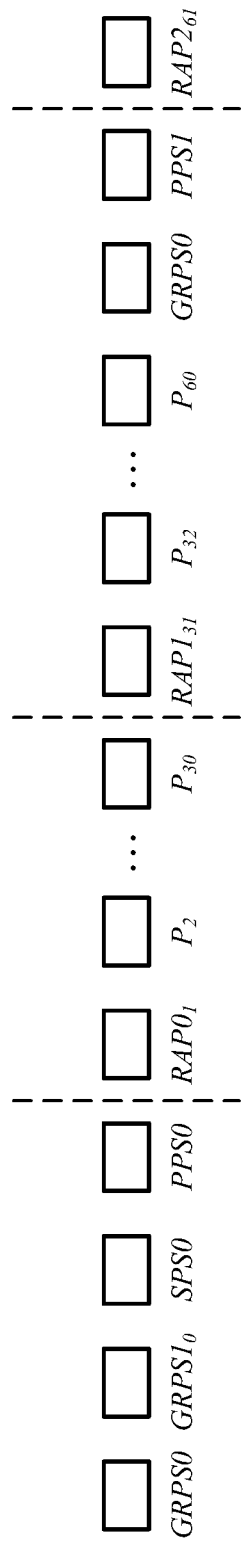

For the sake of redundancy, a bitstream can include multiple copies of encoded data for a global reference picture. FIG. 10*c* shows another example sequence (1030) of units of encoded data, including multiple GRPS units, in a bitstream. In the example sequence (1030), encoded data for the first global reference picture (GRPS0) appears twice. The first global reference picture (GRPS0) is decoded and may be used in inter-picture prediction, but it is not displayed. In the example of FIG. 10c, another global reference picture (GRPS1$_0$) is decoded and displayed, and may be used in inter-picture prediction. More generally, global reference pictures of the GRPS, like SPSs and PPSs, can appear throughout the bitstream.

Figure 10D:
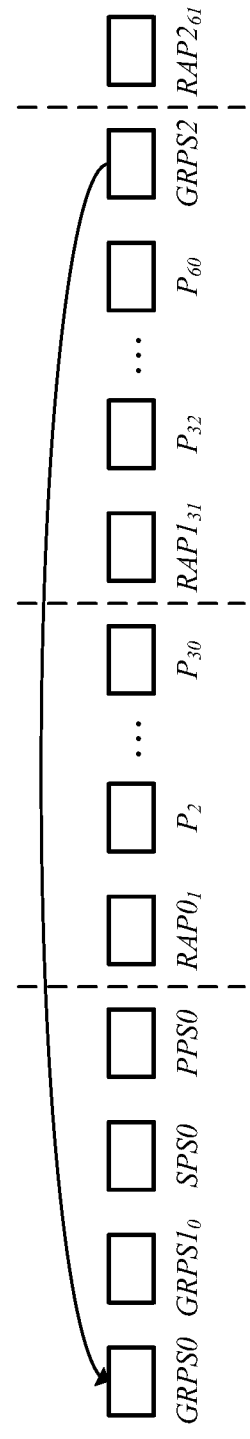

In the preceding examples, each of the global reference pictures is encoded using intra-picture compression, FIG. 10d shows another example sequence (1040) of units of encoded data, including multiple GRPS units, in a bitstream. In the example sequence (1040) of FIG. 10d, one of the global reference pictures (GRPS2) is encoded using inter-picture prediction with an earlier global reference picture (GRPS0) in bitstream order as a reference picture. Another global reference picture (GRPS1$_0$) is encoded using intra-picture coding. A global reference picture of the GRPS, when encoded using inter-picture prediction, only references global reference pictures that are earlier in bitstream order. Potentially, a global reference picture may rely on a chain of earlier global reference pictures, in which case the video decoder decodes and buffers any earlier global reference pictures in the prediction chain that are not yet available. To limit decoding delay, the video encoder can constrain the length of the prediction chain for GRPS inter-picture prediction. If the constraint is 0, each global reference picture is encoded using intra-picture coding. In this case, using a global reference picture for inter-picture prediction of any picture adds decoding delay of at most one picture.

To reduce decoding delay introduced by the use of global reference pictures in inter-picture prediction, a video decoder can buffer the global reference pictures of the GRPS. The global reference pictures of the GRPS can be buffered in a DPB or other buffer. In some example implementations, a video decoder updates the global reference pictures in the buffer based on control information signaled by a video encoder. Alternatively, a video decoder buffers global reference pictures of a GRPS on a "best efforts" basis, recovering missing global reference pictures as need by skimming the bitstream or requesting retransmission of encoded data for the global reference pictures of the GRPS. For example, the video decoder buffers up to n global reference pictures (where ii depends on implementation), then starts to discard global reference pictures (e.g., starting with the least recently used global reference picture or oldest global reference picture, or identifying a global reference picture to discard in some other way). In this case, the video decoder recovers the discarded global reference pictures as needed during later decoding.

3. Example Encoding that Uses a GRPS.

Figure 11:
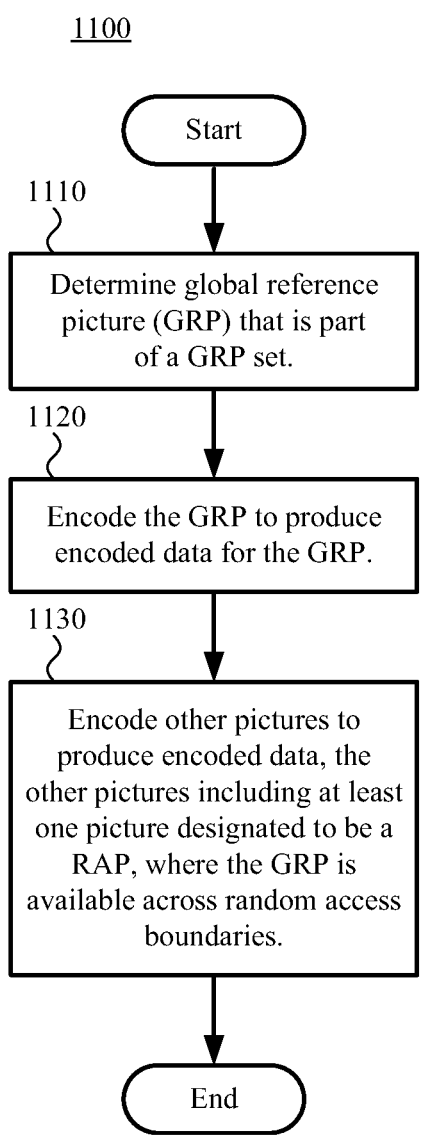
FIGS. 11 and 12 are flowcharts illustrating example techniques for video encoding and video decoding, respectively, using a global reference picture that is part of a GRPS.

FIG. 11 shows an example technique (1100) for video encoding using a global reference picture that is part of a GRPS. A video encoder system (such as the video encoder system (300) described with reference to FIG. 3 or another video encoder system) performs the technique (1100) when encoding one or more pictures of a video sequence to produce encoded data.

The video encoder system determines (1110) a global reference picture that is part of a GRPS. For example, the video encoder system selects the global reference picture from among the one or more pictures of the video sequence. Or, as another example, the video encoder system creates the global reference picture from two or more pictures of the video sequence. The next section describes various approaches to determining a global reference picture that is part of a GRPS.

The video encoder system encodes (1120) the global reference picture to produce encoded data for the global reference picture. For example, the video encoder system encodes the global reference picture using only intra-picture compression operations. Alternatively, the video encoder system encodes the global reference picture using inter-picture compression operations. In this case, encoding the global reference picture uses another global reference picture for reference in motion compensation operations. A constraint can limit the depth of a prediction chain within the GRPS (e.g., one picture, two pictures).

The video encoder system also encodes (1130) other pictures to produce encoded data for the other pictures. The other pictures include a picture designated to be a RAP. The global reference picture is available across random access boundaries. Thus, the global reference picture is accessible to encode at least one of the other pictures before a designated RAP in bitstream order and display order, and the global reference picture is also accessible to encode at least one of the other pictures after that designated RAP in bitstream order and display order. As part of the encoding the other pictures, the designated RAP can use the global reference picture for reference in motion compensation operations. Or, a non-RAP picture can use the global reference picture for reference in motion compensation operations.

In some example implementations, the video encoder system also defines one or more parameter sets that control the encoding of the other pictures. For example, the parameter set(s) include an SPS and a PPS. The parameters set(s) are available across random access boundaries. They are accessible to encode at least one of the other pictures before a designated RAP in bitstream order, and they are accessible to encode at least one of the other pictures after that designated RAP in bitstream order.

The encoded data, including the encoded data for the global reference picture and the encoded data for the other pictures, can be output as part of a bitstream. The encoded data for the global reference picture can be marked, with a unit type in the bitstream, as being part of the GRPS. Alternatively, the encoded data for the global reference picture is marked in some other way.

4. Example Encoder-Side Decisions when Using a GRPS.

A video encoder system can use any of various approaches to decide when to add a global reference picture to the GRPS. In different approaches, the video encoder system determines a new global reference picture in different ways.

According to a first set of approaches, the video encoder system periodically adds another global reference picture to the GRPS. If the count of global reference pictures has reached a threshold, the video encoder system can remove a global reference picture from the GRPS (e.g., removing the oldest global reference picture, removing the least recently used global reference picture). In the first set of approaches, the duration of the period between global reference pictures depends on implementation. For example, the duration is 10 seconds, 15 seconds, or some other number of seconds. Within a period between global reference pictures, the video encoder system can periodically designate pictures as RAPs to be encoded using intra-picture compression or using inter-picture prediction with one or more previous global reference pictures (e.g., using the immediately preceding global reference picture of the GRPS).

According to a second set of approaches, the video encoder system detects a scene change in the video sequence. After a scene change has been detected, the video encoder system inserts a new global reference picture of the GRPS. In particular, the global reference picture can be used as a reference picture for the pictures belonging to the scene. For example, the video encoder system selects, or creates, the global reference picture from one or more pictures that follow the scene change. Or, as another example, the video encoder system identifies, from within the GRPS, a global reference picture that was previously associated with the same scene (or a similar scene) in the video sequence. This can be useful when a scene is repeated, or when scenes switch back and forth. In this case, the video encoder system can reuse the previous global reference picture for the same (or similar) scene. When a video decoder system already has the previous global reference picture for the same (or similar) scene, the video encoder system can skip output of encoded data for the global reference picture. In the second set of approaches, as in the first set of approaches, if the count of global reference pictures has reached a threshold, the video encoder system can remove a global reference picture from the GRPS (e.g., removing the oldest global reference picture, removing the least recently used global reference picture).

According to a third set of approaches, the video encoder system evaluates at least some pictures of the video sequence as options for the global reference picture, and identifies the global reference picture from among the evaluated options. Such approaches can be computationally intensive, which makes them more suitable for offline video encoding than for real-time video encoding. For example, suppose the video encoder system evaluates a series of pictures to identify a set of one or more global reference pictures. The video encoder system considers designated RAPs (RAP0, RAP1, RAP2, RAP3, etc.) as candidates for the global reference picture. To simplify analysis, each of the designated RAPs uses at most one global reference picture for inter-picture prediction, and global reference pictures are themselves encoded using intra-picture compression. For each RAPi of the designated RAPs, the video encoder system calculates the cost $c_{i,j}$ of encoding RAPi using another RAPj of the designated RAPs as a global reference picture. When i equals j, the designated RAP RAPi is encoded with intra-picture compression. The cost $c_{i,j}$ can be a rate-distortion cost or other cost metric. The video encoder system selects $GRP_{count}$ global reference pictures for the series (e.g., $GRP_{count}$ can be 1, 2, 3, or some other number of global reference pictures). In particular, for global reference pictures a, b, . . . , g in the set of $GRP_{count}$ global reference pictures, the video encoder system selects the $GRP_{count}$ global reference pictures for which $GRP_{total\_cost}$ is minimized: $GRP_{total\_cost} = c_{a,a} + c_{b,b} + \ldots + c_{g,g} + \Sigma_i$ min j $c_{i,j}$, for i being not one of a, b, . . . , g, and j being one of a, b, . . . , g. The total cost accounts for the cost of encoding each of the candidate global reference pictures with intra-picture compression (that is, $c_{a,a} + c_{b,b} + \ldots + c_{g,g}$). The total cost also accounts for the cost of encoding all of the remaining designated RAPs using the best candidate global reference picture ($\Sigma_i$ min j $c_{i,j}$). The video encoder system can instead permit global reference pictures to be encoded using inter-picture prediction from other global reference pictures (and not require intra-picture coding of global reference pictures).

Alternatively, the video encoder system uses another approach to decide when to add a global reference picture to the GRPS and determine the new global reference picture.

5. Example Decoding that Uses a GRPS.

Figure 12:
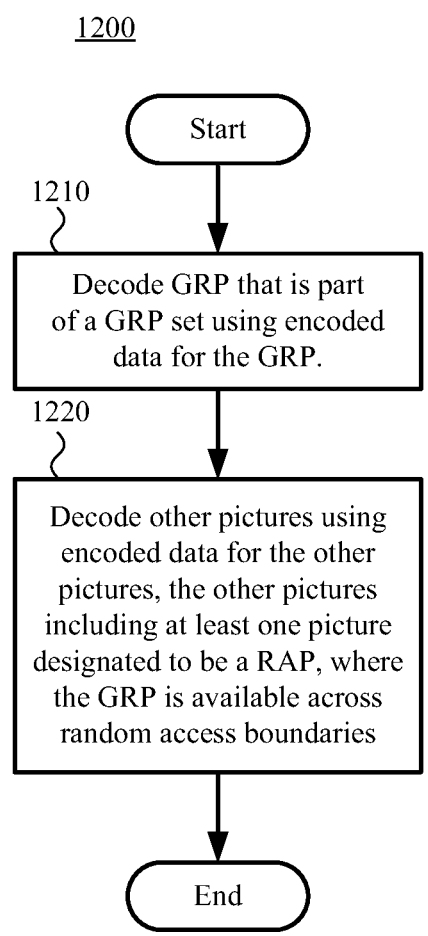

FIG. 12 shows an example technique (1200) for video decoding using a global reference picture that is part of a GRPS. A video decoder system (such as the video decoder system (500) described with reference to FIG. 5 or another video decoder system) performs the technique (1200) when decoding encoded data to reconstruct one or more pictures of a video sequence. The encoded data for the picture(s) of the video sequence includes encoded data for a global reference picture that is part of a GRPS, as well as encoded data for other pictures. The other pictures include at least one picture designated to be a RAP.

With reference to FIG. 12, the video decoder system decodes (1210) the global reference picture using the encoded data for the global reference picture. For example, the video decoder system decodes the global reference picture using only intra-picture decompression operations. Alternatively, the video decoder system decodes the global reference picture using inter-picture decompression operations. In this case, decoding the global reference picture uses another global reference picture for reference in motion compensation operations.

The video decoder system also decodes (1220) the other pictures using the encoded data for the other pictures. The global reference picture is available across random access boundaries. Thus, the global reference picture is accessible to decode at least one of the other pictures before a designated RAP in bitstream order and display order, and the global reference picture is also accessible to decode at least one of the other pictures after that designated RAP in bitstream order and display order. As part of the decoding the other pictures, the designated RAP can use the global reference picture for reference in motion compensation operations. Or, a non-RAP picture can use the global reference picture for reference in motion compensation operations.

In some example implementations, the video decoder system also receives one or more parameter sets that control the decoding of the other pictures. For example, the parameter set(s) include an SPS and a PPS. The parameters set(s) are available across random access boundaries. They are accessible to decode at least one of the other pictures before a designated RAP in bitstream order, and they are accessible to decode at least one of the other pictures after that designated RAP in bitstream order.

The video decoder system can update reference pictures in its DPB or other buffer in various ways. For example, after reconstructing the picture(s) of the video sequence, the video decoder system removes at least one reference picture from its DPB or other buffer, and the video decoder system stores the global reference picture in its DPB or other buffer. Generally, decoding of a designated RAP does not cause removal of the global reference picture from the DPB or other buffer.

During decoding, the video decoder system may determine that a global reference picture is not available. In this case, the video decoder system can skim the bitstream to locate the encoded data for the global reference picture. Or, the video decoder system can request re-transmission of the encoded data for the global reference picture.

C. Reference Picture Clipping.

This section describes innovations in clipping of reference pictures during video encoding and video decoding. For example, a video encoder and video decoder clip a reference picture so that useful regions of the reference picture are retained in memory, while unhelpful or redundant regions of the reference picture are discarded. Reference picture clipping can reduce the amount of memory needed to store reference pictures. Or, reference picture clipping can improve the utilization of available memory by storing a more diverse set of reference pictures to provide better options for motion compensation.

1. Introduction to Reference Picture Clipping.

When video encoding/decoding uses a reference picture for inter-picture prediction, some regions of the reference picture may be frequently accessed, while other regions of the reference picture are not accessed at all. Further, when a buffer stores multiple reference pictures, different reference pictures can include the same picture content for a region that does not change from picture to picture. Storing picture content for regions that are not used for inter-picture prediction, or storing redundant copies of the same picture content for a repeated region, wastes memory at the video encoder and video decoder.

A video encoder and video decoder can use clipping of reference pictures to reduce memory utilization during video encoding/decoding. Instead of storing an entire reference picture in a DPB or other buffer, a video encoder/decoder stores one or more regions of the reference picture in the DPB or other buffer. If reference pictures are clipped carefully, high coding efficiency is maintained.

Alternatively, a video encoder and video decoder can use clipping of reference pictures to provide a more diverse set of reference pictures during video encoding/decoding. For a given amount of memory available to buffer reference pictures, clipping of reference pictures allows the video encoder/decoder to store diverse content from more reference pictures, which can improve coding efficiency by providing more options for motion compensation.

2. Example Uses of Reference Picture Clipping.

Figure 13E:
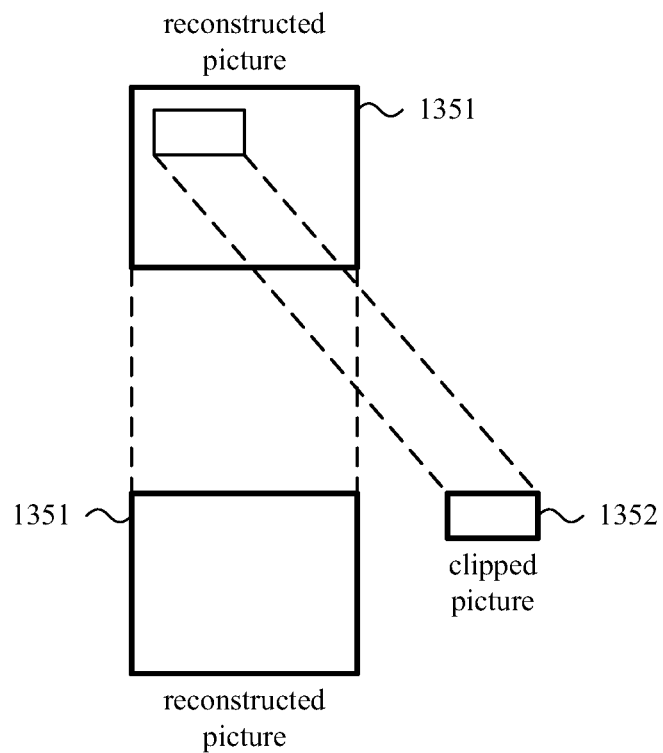

FIG. 13a shows a simple example (1310) of reference picture clipping. The reconstructed picture (1311) is an original reference picture. Clipping parameters define a region for the clipped picture (1312) within the reconstructed picture (1311). Regions of the reconstructed picture (1311) outside the clipped picture (1312) are discarded.

In FIG. 13a, a single clipped reference picture is created from an original reference picture. Alternatively, multiple clipped reference pictures can be created from a single original reference picture. FIG. 13b shows an example (1320) in which two clipped pictures (1322, 1323) are created from one reconstructed picture (1321). Clipping parameters define the two clipped pictures (1322, 1323), which do not overlap. Regions of the reconstructed picture (1321) outside the clipped pictures (1322, 1323) are discarded. FIG. 13c shows an example (1330) in which two overlapping clipped pictures (1332, 1333) are created from a reconstructed picture (1331). In this example, the two clipped pictures (1332, 1333), which are defined by clipping parameters, share some of the same picture content from the reconstructed picture (1331). Regions of the reconstructed picture (1331) outside the clipped pictures (1332, 1333) are discarded.

In the examples of FIGS. 13a-13c, clipped pictures are not scaled. Alternatively, a clipped picture can be scaled. FIG. 13d shows an example (1340) in which a clipped, scaled picture (1342) is created from a reconstructed picture (1341). Clipping parameters define the clipped, scaled picture (1342). Regions of the reconstructed picture (1341) outside the clipped, scaled picture (1342) are discarded. Typically, a clipped picture is scaled down in order to reduce memory usage. Scaling down a clipped reference picture may also improve coding efficiency when content "zooms out" from picture to picture. Conversely, scaling up a clipped reference picture may improve coding efficiency when content "zooms in" from picture to picture. Alternatively, a reference picture can be scaled up or scaled down without clipping.

in FIGS. 13a-13d, one or more clipped reference pictures replace an original reference picture. Alternatively, the original reference picture can also be retained for use in inter-picture prediction. FIG. 13e shows an example (1350) in which a clipped picture (1352) is created from a reconstructed picture (1351), and the entire reconstructed picture (1351) is also retained for use in inter-picture prediction.

In the examples of FIGS. 13a-13e, clipped pictures are rectangular. Alternatively, a clipped picture can have another shape (e.g., an irregular shape).

Each of the clipped reference pictures can be assigned a reference picture index. The reference picture indices identify the respective clipped reference pictures when they are used in inter-picture prediction. The reference picture indices can also he used to locate the respective clipped reference pictures in a buffer. Values of the reference picture indices for the clipped reference pictures can be assigned by the video encoder and video decoder, which apply the same rules to assign the values. Or, values of reference picture indices for the clipped reference pictures can be assigned by the video encoder and signaled to the video decoder.

In some example implementations, a video encoder decides whether to clip reference pictures and, if so, decides how to clip the reference pictures. The video encoder sends clipping information to a video decoder so that the video decoder can clip reference pictures in the same way. In other example implementations, a video encoder and video decoder each apply rules to decide whether to clip reference pictures and, if so, decide how to clip the reference pictures. In this case, the video encoder need not signal clipping information to the video decoder, since the video decoder independently derives clipping parameters for clipped reference pictures. Section V.C.4 describes various approaches to making decisions for reference picture clipping.

Clipping parameters are determined and stored for the respective clipped reference pictures. For example, the clipping parameters for a clipped reference picture include a picture order count or other information that identifies the original reconstructed picture, the spatial resolution of the original reconstructed picture, and the location of the clipped reference picture within the original reconstructed picture. The location of the clipped reference picture within the original reconstructed picture can be specified with the coordinates of two corners of the clipped reference picture (e.g., top-left corner and bottom-right corner), with the coordinates of one corner of the clipped reference picture and the width/height of the clipped reference picture, or in some other way. Conceptually, the clipping parameters specify a virtual reference picture with the dimensions of the original reconstructed picture but having actual picture content only for the clipped reference picture at its location within the original reference picture. A scaling factor can indicate any scaling applied for the clipped reference picture.

A video encoder and video decoder can use clipped reference pictures in inter-picture prediction by compensating for clipping (and possibly scaling) during motion compensation. The video encoder and video decoder handle motion information as normal—an MV for a current block indicates a displacement in a reference picture relative to the collocated position of the current block in the reference picture. The displacement is specified in the original resolution for the reference picture. Coding and decoding processes for motion information (e.g., prediction, entropy coding/decoding) are unchanged (that is, the processes for regular reference pictures are used). For inter-picture prediction, the video encoder and video decoder compensate for clipping by combining an offset (indicated by location information in the clipping parameters) with the location referenced by the MV (e.g., subtracting the offset from the value of the MV, subtracting the offset from the collocated position of the current block in the reference picture, or subtracting the offset from the final location indicated by the MV). When a scaling factor has been applied to the reference picture, the video encoder and video decoder use the scaling factor to scale the value of the MV appropriately, from the original resolution for the reference picture to the resolution of the scaled reference picture. Also, for a clipped, scaled reference picture, the video encoder and video decoder scale the offset applied to the location referenced by the MV.

FIG. 14 illustrates an example (1400) of motion compensation involving a clipped reference picture. In FIG. 14, a current picture (1410) includes a current block (1412) having a MV (1414). The top-let: corner of the current block (1412) in the current picture (1410) is at location (256, 192). The MV (1414) indicates a displacement of (−127, −66), relative to the top-left corner of the current block (1412).

FIG. 14 shows a reconstructed picture (1420), which is an original reference picture, as well as a clipped reference picture (1422) within the reconstructed picture (1420). The clipped reference picture (1422) is the rectangle whose top-left corner is (96, 64) and whose bottom-right corner is (512, 256) in the reconstructed picture (1420).

The MV (1414) indicates a prediction block (1424) whose top-left corner is at location (33, 66) in the clipped reference picture (1422). The location of the prediction block (1424) in the clipped reference picture (1422) is the location of the current block (1412) plus the MV (1414) minus the offset from the location of the clipped reference picture (1422):

(256, 192)+(−127, −66)−(96, 64)=(33, 62).

For the sake of comparison, the MV (1414) would indicate a prediction block (1424) whose top-left corner is at location (129, 126) in the original reference picture. The location of the prediction block (1424) in the original reference picture (1420) would be the location of the current block (1412) plus the MV (1414):

(256, 192)+(−127, −66)=(129, 126).

Clipping reference pictures can significantly reduce the amount of memory used to store reference pictures. For example, consider a hierarchical B-picture coding structure with a group of pictures ("GOP") size of 8, and with temporal scalability enabled. For a lowest layer, every eighth picture (e.g., pictures 0, 8, 16, 24, etc. in display order) is coded using intra-picture coding or inter-picture prediction relative to a previous picture in the lowest layer. For the next layer, pictures halfway between the pictures of the lowest layer (e.g., pictures 4, 12, 20, 28, etc. in display order) are added and coded using bi-directional inter-picture prediction. For the next layer, pictures halfway between the pictures of the lower two layers (e.g., pictures 2, 6, 10, 14, etc. in display order) are added and coded using bi-directional inter-picture prediction. Finally, for the last layer, pictures between the pictures of the previous three layers (e.g., pictures 1, 3, 5, 7, etc. in display order) are added and coded using bi-directional inter-picture prediction. For this coding structure, the video encoder and video decoder may need to buffer four reference pictures during decoding: two reconstructed pictures from the lowest layer, a reconstructed picture from the second layer, and a reconstructed picture from the third layer. If a computer system only has enough memory to buffer two full reference pictures, decoding will not be possible for video encoded in the hierarchical B-picture coding structure with GOP size of 8, since four full reference pictures cannot be buffered. A smaller GOP size (such as 2) may be used instead, with decreased coding efficiency. Or, clipping of reference pictures can reduce the amount of memory used to buffer the four reference pictures when GOP size is 8. In this case, the video encoder and video decoder selectively retain regions of the reconstructed pictures in clipped reference pictures, subject to the ceiling on overall memory used to buffer reference pictures.

More generally, clipping of reference pictures can reduce the amount of memory used to buffer reference pictures for video that is encoded with any of various coding structures (e.g., hierarchical B-picture coding structure, non-hierarchical B-picture coding structure, hierarchical P-picture coding structure, non-hierarchical P-picture coding structure), with temporal scalability enabled or disabled.

3. Example Reference Picture Clipping During Encoding/Decoding.

Figure 15:
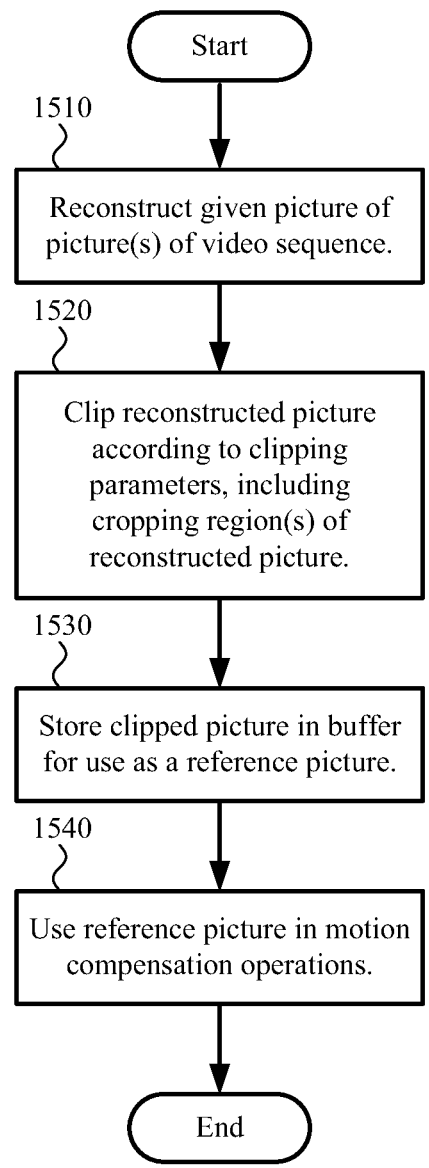
FIG. 15 is a flowchart illustrating an example technique for clipping a reference picture during video encoding or video decoding.

FIG. 15 shows an example technique (1500) for clipping a reference picture during video encoding or video decoding. A video encoder system (such as the video encoder system (300) described with reference to FIG. 3 or another video encoder system) performs the technique (1500) when encoding one or more pictures of a video sequence to produce encoded data. Or, a video decoder system (such as the video decoder system (500) described with reference to FIG. 5 or another video decoder system) performs the technique (1500) when decoding encoded data to reconstruct one or more pictures of a video sequence.

With reference to FIG. 15, a video encoder system or video decoder system reconstructs (1510) a given picture of one or more pictures of a video sequence. The video encoder/decoder system clips (1520) the reconstructed picture according to clipping parameters. In doing so, the video encoder/decoder system crops at least some regions of the reconstructed picture to produce a clipped picture. The video encoder/decoder system can also incorporate scaling of spatial resolution. For example, the video encoder/decoder system scales the reconstructed picture before the clipping. Or, as another example, the video encoder/decoder system scales the clipped picture.

In some example implementations, the video encoder system and video decoder system determine clipping parameters according to one or more rules. In this case, the video encoder system need not signal clipping information in the bitstream that indicates the clipping parameters, since the video decoder system independently derives the clipping parameters. The next section describes example approaches to setting clipping parameters, which can be applied by the video encoder system and video decoder system.

Alternatively, the video encoder system can determine and output, as part of the bitstream, clipping information that indicates the clipping parameters. In this case, the video decoder system receives the clipping information and uses it to determine the clipping parameters. For example, the clipping information includes information indicating the location of the clipped picture within the reconstructed picture. The location can be specified with the coordinates of the top-left corner and bottom-right corner of the clipped picture in the reconstructed picture. Or, the location can be specified with the coordinates of the top-left corner and the width/height of the clipped picture. Or, the location of the clipped picture can be specified in some other way. The clipping information can also include an identifier of the reconstructed picture and original spatial resolution of the reconstructed picture. A scaling factor in the bitstream can indicate how to scale the reconstructed picture before the clipping or how to scale the clipped picture. The next section describes example approaches to setting clipping parameters, which can be applied by the video encoder system when defining clipping information.

The video encoder/decoder system stores (1530) the clipped picture in a buffer for use as a reference picture. The buffer can be a DPB or other buffer at the video encoder/decoder system. The video encoder/decoder system subsequently uses (1540) the reference picture in motion compensation operations. In some example implementations, when encoding/decoding a current block of a current picture, the video encoder/decoder system determines a MV for the current block. The current block references the reference picture (clipped reference picture) at least one of the motion compensation operations. The video encoder/decoder system adjusts the location referenced by the MV to compensate for the clipping. For example, the video encoder/decoder system combines (adds or subtracts) a horizontal offset and/or vertical offset to account for the location of the clipped picture within the original reconstructed picture. The video encoder/decoder system can also adjust the MV to compensate for scaling of the reference picture. For example, the video encoder/decoder system scales the MV by the same scaling factor as the (clipped) reference picture. The video encoder/decoder system can also adjust the offset for clipping, to compensate for scaling of the reference picture.

The video encoder system or video decoder system assigns a reference picture index to the (clipped) reference picture. The reference picture index can be assigned by the video encoder system and video decoder system according to one or more rules. Or, the video encoder system can assign the reference picture index and signal information in the bitstream that indicates the reference picture index, in which case the video decoder system receives the information and assigns the reference picture index accordingly.

The video encoder system or video decoder system can generate multiple clipped reference pictures from one reconstructed picture. For example, the video encoder/decoder system clips the reconstructed picture according to second (or third, fourth, etc.) clipping parameters, which are different than the first clipping parameters previously used. In doing so, the video encoder/decoder system crops at least some regions of the reconstructed picture to produce a second (or third, fourth, etc.) clipped picture different than the first clipped picture. The video encoder/decoder system stores the second (or third, fourth, etc.) clipped picture in the buffer for use as a reference picture in inter-picture prediction, assigning different reference picture indices to different clipped reference pictures. When multiple clipped pictures are created from the same reconstructed picture, the multiple clipped pictures can be overlapping or non-overlapping.

In addition to buffering one or more clipped reference pictures generated from a reconstructed picture, the video encoder system or video decoder system can store the original reconstructed picture in a buffer for use as a reference picture.

4. Example Decisions when Setting Clipping Parameters.

A video encoder system and video decoder system can use any of various approaches to set clipping parameters used to generate a clipped reference picture from a reconstructed picture.

According to a first set of approaches, a video encoder system or video decoder system sets clipping parameters to avoid storing redundant picture content in reference pictures. For example, the video encoder system or video decoder system compares a reconstructed picture to one or more other pictures, which were previously reconstructed. Based on results of the comparison, the video encoder system or video decoder system identifies a new region in the reconstructed picture, then defines the clipping parameters to include the new region but exclude at least one other region of the reconstructed picture. Or, as another example, the video encoder system or video decoder system identifies regions of the reconstructed picture that were copied from another picture. The video encoder system or video decoder system defines the clipping parameters to exclude the copied regions but include at least one other region (new, non-copied region) of the reconstructed picture. In this way, the video encoder/decoder system can drop regions that were directly copied from another picture (without residual values), but store other regions as part of clipped reference pictures.

Rather than identify new regions on a low-level, block-by-block basis, the video encoder system or video decoder system can make decisions for larger sections of the reconstructed picture. For example, the video encoder system or video decoder system determines whether a threshold proportion of blocks in a section lack residual values (that is, are copied from another picture). If so, the section is retained as part of a clipped reference picture. Or, the video encoder system or video decoder system determines whether a threshold proportion of blocks in a section is intra-coded (and, hence, are assumed to have new picture content). If so, the section is retained as part of a clipped reference picture. For either test, the threshold proportion depends on implementation (e.g., 80%, 90%).

According to a second set of approaches, a video encoder system sets clipping parameters to preserve picture content that is actually used for reference pictures. For example, the video encoder system measures usage of a reconstructed picture as a reference picture in motion estimation for one or more other pictures. The video encoder system identifies a used region in the reconstructed picture, then defines the clipping parameters to include the used region but exclude at least one other region of the reconstructed picture. The video encoder system can concurrently evaluate multiple reconstructed pictures to determine which regions are actually used for reference in inter-picture prediction for blocks of a given picture. If a region of one of the reconstructed pictures is never used for reference in inter-picture prediction, the video encoder system removes the region. After eliminating non-used regions in this way, the video encoder system can use the remaining regions (now part of one or more clipped reference pictures) in inter-picture prediction for blocks of the given picture.

Rather than identify regions that are used for inter-picture prediction on a low-level, block-by-block basis, the video encoder system can make decisions for larger sections of the reconstructed picture. For example, the video encoder system determines whether a threshold proportion of content in a section is used for reference in inter-picture prediction. If so, the section is retained as part of a clipped reference picture. The threshold proportion depends on implementation (e.g., 70%, 80%, 90%).

Alternatively, the video encoder system or video decoder system uses another approach to set clipping parameters. If the video encoder system and video decoder system independently derive the clipping parameters, the video encoder system need not signal the clipping parameters to the video decoder system.

D. Denoising of Reference Pictures.

This section describes innovations in denoising of reference pictures during video encoding and video decoding. For example, a video encoder and video decoder filter a reference picture to remove capture noise (e.g., noise due to camera imperfections during capture). Denoised reference pictures may provide better results in inter-picture prediction, thereby improving video coding efficiency.

1. Introduction to Denoising of Reference Pictures.

When a camera captures video pictures, the captured pictures may include noise introduced randomly by the camera during the capture process. In some cases, random noise in an input picture is attenuated, or smoothed away, during encoding and decoding (e.g., due to quantization). In other cases, however, random noise in an input picture is preserved throughout encoding/decoding processes, so that the reconstructed version of the picture also includes the random noise.

Random noise is different in different input pictures. Due to random noise, the same object may have different sample values in different pictures. As such, random noise in a reference picture can hurt the quality of inter-picture prediction that uses the reference picture. For example, random noise in a current block being encoded is unlikely to match random noise in a corresponding block of the reference picture.

A video encoder and video decoder can filter a reference picture to remove random noise in the reference picture (e.g., noise from camera capture). The "denoised" reference picture typically provides prediction blocks that are closer to matching the blocks being encoded, which reduces the amount of information, or energy, in residual values and thereby improves coding efficiency. Typically, the video encoder and video decoder perform denoising of reference pictures to remove random noise from input pictures in addition to (e.g., after) other filtering of the reference pictures to remove blocking artifacts, ringing artifacts, and other types of error, which are added in encoding/decoding processes.

The video encoder and video decoder store the denoised reference picture in a DPB or other buffer, effectively replacing the original reference picture. Alternatively, the video encoder and video decoder can also store the original reference picture in the DPB or other buffer, providing another option for inter-picture prediction.

2. Example Uses of Denoising of Reference Pictures.

A video encoder and video decoder can each apply the same set of rules when filtering a reference picture to remove random noise. In this case, the video encoder need not signal any filter information to the video decoder. The video encoder and video decoder independently derive any filter parameters for the filter and apply the filter to the reference picture. The filter can be a fixed filter, which does not change during encoding/decoding. Or, the filter can be an adaptive filter, which changes during encoding/decoding. For example, the video encoder and video decoder apply a lowpass filter in the frequency domain (e.g., on frequency-domain data). Or, the video encoder and video decoder calculate average sample values in the spatial/temporal domain. Or, the video encoder and video decoder calculate median sample values in the spatial/temporal domain. Or, the video encoder and video decoder apply a filter that uses block matching and three-dimensional ("BM3D") filtering. Alternatively, the video encoder and video decoder perform some other type of filtering to remove random noise from a reconstructed picture.

Determining filter parameters for denoising on a picture-by-picture basis can be a computationally-intensive process, especially if the filtering uses BM3D filtering or a similar process. In some cases, a video decoder system lacks the resources to determine filter parameters for denoising. To address this concern, a video encoder can determine filter parameters for denoising during encoding, then signal filter information that indicates the filter parameters to a video decoder. The video decoder can use the filter information to quickly determine the filter parameters for the filter, which the video decoder uses for denoising.

Figure 16A:
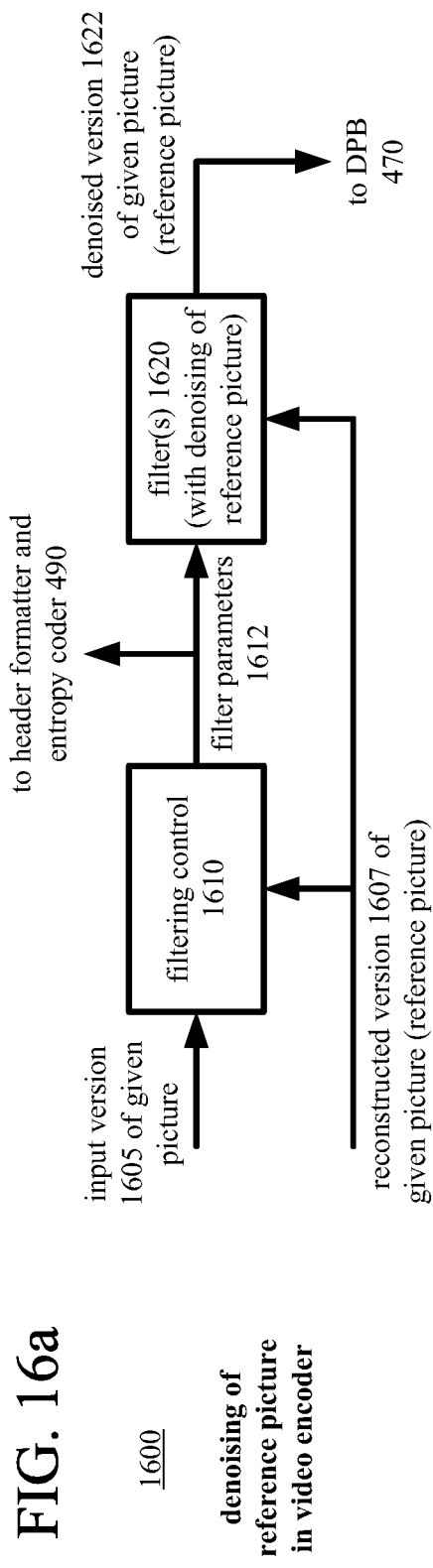
FIGS. 16a-16b are diagrams illustrating examples of a video encoder and video decoder, respectively, that use denoising of reference pictures.
Figure 16B:
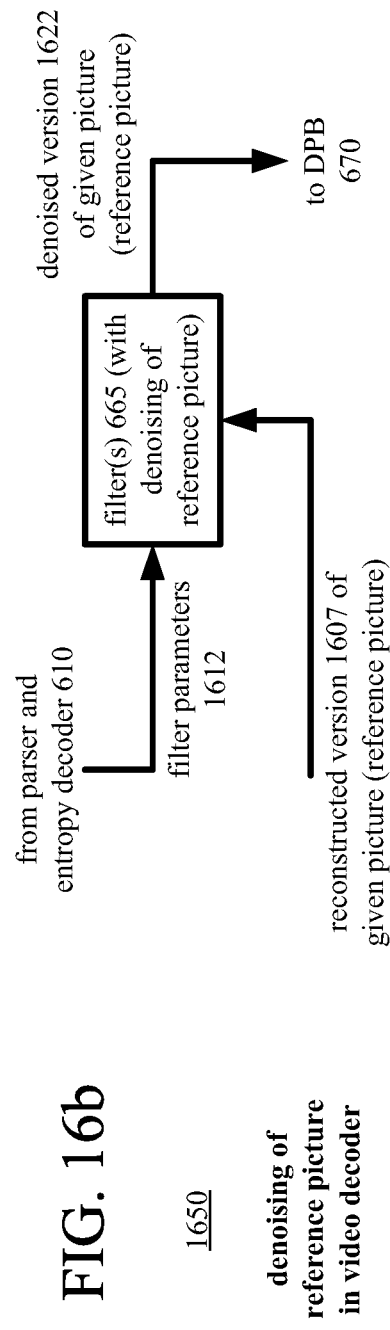

FIGS. 16a and 16b illustrate examples of a video encoder (1600) and video decoder (1650), respectively, that use denoising of reference pictures, where the video encoder (1600) determines filter parameters and signals them to the video decoder (1650). Some of the components shown in FIGS. 16a and 16b correspond to components in FIGS. 4a and 6.

With reference to FIG. 16a, the video encoder (1600) includes a filtering control (460) and one or more filters (465), which perform denoising of reference pictures. The filtering control (460) receives an input version (1605) of a given picture and a reconstructed version (1607) of the given picture (that is, a reference picture).

The filtering control (460) calculates filter parameters (1612). For example, the filtering control (460) performs denoising on the input version (1605) of the given picture using BM3D filtering or another type of filtering. Then, the filtering control (460) uses the denoised, input version of the given picture as an optimization target to derive the filter parameters (1612). The optimization yields filter parameters that will make the reconstructed version (1607) of the given picture more like the denoised, input version of the given picture. In some example implementations, the filter parameters (1612) are adaptive loop filter ("ALF") parameters or some other variation of parameters for a Wiener filter. Alternatively, the filter parameters (1612) are another type of filter parameters.

The filter parameters (1612) are provided to the filter(s) (465) and to a header formatter/entropy coder (490). The header formatter/entropy coder (490) produces filter information for output in the bitstream of encoded data. The filter information indicates the filter parameters. The filter(s) (465) in the video encoder use the filter parameters (1612) to determine how to denoise the reconstructed version (1607) of the given picture (reference picture). Filtering produces a denoised version (1622) of the given picture (reference picture), which is provided to the DPB (470) or another buffer.

With reference to FIG. 16b, the video decoder (1600) includes one or more filters (665), which perform denoising of reference pictures. The filter(s) (665) receive filter parameters (1612) from a parser/entropy decoder (610). For example, the filter parameters (1612) are ALF parameters or sonic other variation of parameters for a Wiener filter. Alternatively, the filter parameters (1612) are another type of filter parameters.

The filter(s) (665) also receive a reconstructed version (1607) of the given picture (that is, a reference picture). The filter(s) (665) in the video decoder use the filter parameters (1612) to determine how to denoise the reconstructed version (1607) of the given picture (reference picture). Filtering produces a denoised version (1622) of the given picture (reference picture), which is provided to the DPB (670) or another buffer.

3. Example Denoising of Reference Pictures During Encoding/Decoding.

FIG. 17 shows an example technique (1700) for denoising a reference picture during video encoding or video decoding. A video encoder system (such as the video encoder system (300) described with reference to FIG. 3 or another video encoder system) performs the technique (1700) when encoding one or more pictures of a video sequence to produce encoded data. Or, a video decoder system (such as the video decoder system (500) described with reference to FIG. 5 or another video decoder system) performs the technique (1700) when decoding encoded data to reconstruct one or more pictures of a video sequence.

With reference to FIG. 17, the video encoder system or video decoder system reconstructs (1710) a given picture of one or more pictures of a video sequence. The video encoder/decoder system filters (1720) the reconstructed picture, with a filter adapted to remove random noise, to produce a denoised picture. For example, the filter is a variation of frequency-domain lowpass filter, a variation of spatial/temporal-domain lowpass filter, a variation of spatial/temporal-domain median filter, or a filter that uses block-matching and three-dimensional filtering.

In some example implementations, the video encoder system and video decoder system each determine filter parameters for the filter according to one or more rules. In this case, the video encoder system need not signal filter information in the bitstream that indicates the filter parameters, since the video decoder system independently derives the filter parameters.

Alternatively, the video encoder system can determine filter parameters and output, as part of the bitstream, filter information that indicates the filter parameters. In this case, the video decoder system receives the filter information and uses it to determine the filter parameters. For example, the video encoder system filters an input version of the given picture to produce a denoised, input version of the given picture, then determines filter parameters for the filter based on results of comparing the denoised, input version of the given picture to the reconstructed picture. In particular, the denoised, input version of the given picture can be used as an optimization target for the reconstructed picture.

The video encoder/decoder system stores (1730) the denoised picture in a buffer for use as a reference picture. The buffer can be a DPB or other buffer at the video encoder/decoder system. The video encoder/decoder system subsequently uses (1740) the reference picture in motion compensation operations.

The video encoder system or video decoder system assigns a reference picture index to the (denoised) reference picture. The reference picture index can be assigned by the video encoder system and video decoder system according to one or more rules. Or, the video encoder system can assign the reference picture index and signal information in the bitstream that indicates the reference picture index, in which case the video decoder system receives the information and assigns the reference picture index accordingly.

In addition to buffering a denoised reference picture generated from a reconstructed picture, the video encoder system or video decoder system can store the original reconstructed picture in a buffer for use as a reference picture.

E. Features.

Different embodiments may include one or more of the inventive features shown in the following table of features.

| # | Feature |
|---|---|
| | A. Encoding with Global Reference Picture Set. |
| A1 | In a computer system that implements a video encoder, a method comprising: encoding one or more pictures of a video sequence to produce encoded data, including: determining a global reference picture that is part of a global reference picture set; encoding the global reference picture to produce encoded data for the global reference picture; encoding other pictures to produce encoded data for the other pictures, the other pictures including at least one picture designated to be a random access picture, wherein the global reference picture is available across one or more random access boundaries defined by the at least one picture designated to be a random access picture; and outputting the encoded data as part of a bitstream, the encoded data including the encoded data for the global reference picture and the encoded data for the other pictures. |
| A2 | The method of claim A1, wherein the global reference picture is accessible to encode at least one of the other pictures before the designated random access picture in bitstream order and display order, and wherein the global reference picture is accessible to encode at least one of the other pictures after the designated random access picture in bitstream order and display order. |
| A3 | The method of claim A1, wherein, as part of the encoding the other pictures, the designated random access picture uses the global reference picture for reference in motion compensation operations. |
| A4 | The method of claim A3, wherein the global reference picture has a reference picture identifier, and wherein the motion compensation operations use the reference picture identifier to locate the global reference picture in a buffer. |
| A5 | The method of any one of claims A1-A4, wherein the encoding the one or more pictures of the video sequence includes: defining one or more parameter sets that control the encoding the other pictures, wherein the one or more parameters sets are available across the one or more random access boundaries. |
| A6 | The method of claim A5, wherein the one or more parameter sets include a sequence parameter set and a picture parameter set. |

| # | Feature |
|---|---|
| A7 | The method of any one of claims A1-A6, wherein the encoding the global reference picture uses only intra-picture compression operations. |
| A8 | The method of any one of claims A1-A6, wherein the encoding the global reference picture uses another global reference picture for reference in motion compensation operations. |
| A9 | The method of claim A8, wherein, as part of the encoding the global reference picture, a constraint limits depth of a prediction chain within the global reference picture set. |
| A10 | The method of any one of claims A1-A9, wherein the encoded data for the global reference picture is marked, with a unit type in the bitstream, as being part of the global reference picture set. |
| A11 | The method of any one of claims A1-A10, wherein the encoding the other pictures includes, for a given picture of the other pictures: constructing a current reference picture set that includes pictures available for reference in motion compensation operations for the given picture and any picture later than the given picture in coding order, the current reference picture set including the global reference picture; and constructing one or more reference picture lists from the current reference picture set. |
| A12 | The method of any one of claims A1-A11, wherein the determining the global reference picture includes selecting the global reference picture from among the one or more pictures of the video sequence. |
| A13 | The method of any one of claims A1-A11, wherein the determining the global reference picture includes creating the global reference picture from two or more pictures of the video sequence. |
| A14 | The method of any one of claims A1-A11, wherein the encoding the one or more pictures of the video sequence includes periodically adding another global reference picture to the global reference picture set. |
| A15 | The method of any one of claims A1-A11, wherein the determining the global reference picture includes: detecting a scene change in the video sequence; and selecting or creating the global reference picture from those of the one or more pictures that follow the scene change. |
| A16 | The method of any one of claims A1-A11, wherein the determining the global reference picture includes: detecting a scene change to a scene in the video sequence; and identifying, from within the global reference picture set, the global reference picture as being previously associated with the scene in the video sequence. |
| A17 | The method of any one of claims A1-A11, wherein the determining the global reference picture includes: evaluating at least some pictures of the video sequence as options for the global reference picture. identifying the global reference picture from among the evaluated options. |
| A18 | A computer system comprising: a video encoder configured to perform video encoding operations of the method of any one of claims A1-A17; and a buffer configured to store the part of the bitstream. |
| A19 | One or more computer-readable media having stored therein computer-executable instructions for causing a computer system programmed thereby to perform video encoding operations as defined in the method of any one of claims A1-A17. |
| A20 | One or more computer-readable media having stored therein the encoded data produced by the method of any one of claims A1-A17. |
| | B. Decoding with Global Reference Picture Set. |
| B1 | In a computer system that implements a video decoder, a method comprising: receiving, as part of a bitstream, encoded data for one or more pictures of a video sequence, the encoded data including: encoded data for a global reference picture that is part of a global reference picture set; and encoded data for other pictures, the other pictures including at least one picture designated to be a random access picture; and decoding the encoded data to reconstruct the one or more pictures, including: decoding the global reference picture; and decoding the other pictures, wherein the global reference picture is available across one or more random access boundaries defined by the at least one picture designated to be a random access picture. |
| B2 | The method of claim B1, wherein the global reference picture is accessible to decode at least one of the other pictures before the designated random access picture in bitstream order and display order, and wherein the global reference picture is accessible to decode at least one of the other pictures after the designated random access picture in bitstream order and display order. |
| B3 | The method of claim B1, wherein, as part of the decoding the other pictures, the designated random access picture uses the global reference picture for reference in motion compensation operations. |

| # | Feature |
|---|---|
| B4 | The method of claim B3, wherein the global reference picture has a reference picture identifier, and wherein the motion compensation operations use the reference picture identifier to locate the global reference picture in a buffer. |
| B5 | The method of any one of claims B1-B4, wherein the encoded data for the one or more pictures of the video sequence further includes:<br>one or more parameter sets that control the decoding the other pictures, wherein the one or more parameters sets are available across the one or more random access boundaries. |
| B6 | The method of claim B5, wherein the one or more parameter sets include a sequence parameter set and a picture parameter set. |
| B7 | The method of any one of claims B1-B6, wherein the decoding the global reference picture uses only intra-picture decompression operations. |
| B8 | The method of any one of claims B1-B6, wherein the decoding the global reference picture uses another global reference picture for reference in motion compensation operations. |
| B9 | The method of any one of claims B1-B8, wherein the encoded data for the global reference picture is marked, with a unit type in the bitstream, as being part of the global reference picture set. |
| B10 | The method of any one of claims B1-B9, wherein the decoding the other pictures includes, for a given picture of the other pictures:<br>constructing a current reference picture set that includes pictures available for reference in motion compensation operations for the given picture and any picture later than the given picture in coding order, the current reference picture set including the global reference picture; and<br>constructing one or more reference picture lists from the current reference picture set. |
| B11 | The method of any one of claims B1-B10, wherein the decoding the encoded data to reconstruct the one or more pictures further includes:<br>removing a reference picture from a buffer; and<br>storing the global reference picture in the buffer. |
| B12 | The method of claim B11, wherein decoding of the designated random access picture does not cause removal of the global reference picture from the buffer. |
| B13 | The method of any one of claims B1-B10, wherein the decoding the other pictures includes:<br>determining that the global reference picture is not available in a buffer; and<br>skimming the bitstream to locate the encoded data for the global reference picture. |
| B14 | The method of any one of claims B1-B10, wherein the decoding the other pictures includes:<br>determining that the global reference picture is not available in a buffer; and<br>requesting re-transmission of the encoded data for the global reference picture. |
| B15 | A computer system comprising:<br>a video decoder configured to perform video decoding operations of the method of any one of claims B1-B14; and<br>a buffer configured to store the part of the bitstream. |
| B16 | One or more computer-readable media having stored therein computer-executable instructions for causing a computer system programmed thereby to perform video decoding operations as defined in the method of any one of claims B1-B14. |

C. Bitstream of Video Encoded with Global Reference Picture Set.

| # | Feature |
|---|---|
| C1 | One or more computer-readable media having stored therein encoded data for one or more pictures of a video sequence, the encoded data for the one or more pictures of the video sequence including:<br>encoded data for a global reference picture that is part of a global reference picture set; and<br>encoded data for other pictures, the other pictures including a picture designated to be a random access picture; and<br>wherein the encoded data for the one or more pictures of the video sequence is configured for decoding by a video decoder with video decoding operations that include:<br>decoding the global reference picture; and<br>decoding the other pictures, wherein the global reference picture is available across one or more random access boundaries defined by the at least one picture designated to be a random access picture. |
| C2 | The one or more computer-readable media of claim C1, wherein the encoded data for the one or more pictures of the video sequence further includes:<br>one or more parameter sets that control the decoding the other pictures, wherein the one or more parameters sets are available across random access boundaries. |

D. Encoding with Clipping of Reference Pictures.

| # | Feature |
|---|---|
| D1 | In a computer system that implements a video encoder, a method comprising:<br>encoding one or more pictures of a video sequence to produce encoded data, including:<br>reconstructing a given picture of the one or more pictures; |

-continued

| # | Feature |
|---|---|
| | clipping the reconstructed picture according to clipping parameters, including cropping at least some regions of the reconstructed picture to produce a clipped picture; storing the clipped picture in a buffer for use as a reference picture; and using the reference picture in motion compensation operations; and outputting the encoded data as part of a bitstream. |
| D2 | The method of claim D1, wherein the encoding the one or more pictures of the video sequence further comprises one or more of: scaling the reconstructed picture before the clipping; and scaling the clipped picture. |
| D3 | The method of any one of claims D1-D2, wherein clipping information in the bitstream indicates the clipping parameters, and wherein the clipping information includes information indicating location of the clipped picture within the reconstructed picture. |
| D4 | The method of claim D3, wherein a sealing factor in the bitstream indicates one or more of: scaling the reconstructed picture before the clipping; and scaling the clipped picture. |
| D5 | The method of any one of claims D1-D2, wherein the encoding the one or more pictures of the video sequence further comprises: determining the clipping parameters according to one or more rules. |
| D6 | The method of any one of claims D1-D5, wherein the encoding the one or more pictures of the video sequence further comprises: determining a motion vector for a current block of a current picture, wherein the current block references the reference picture in at least one of the motion compensation operations; and adjusting a location referenced by the motion vector to compensate for the clipping. |
| D7 | The method of any one of claims D1-D6, wherein the encoding the one or more pictures of the video sequence further comprises: assigning a reference picture index to the reference picture. |
| D8 | The method of claim D7, wherein information in the bitstream indicates the reference picture index. |
| D9 | The method of claim D7, wherein the reference picture index is assigned according to one or more rules. |
| D10 | The method of any one of claims D1-D9, wherein the clipping parameters are first clipping parameters, the clipped picture is a first clipped picture, and the reference picture is a first reference picture, and wherein the encoding the one or more pictures of the video sequence further comprises: clipping the reconstructed picture according to second clipping parameters different than the first clipping parameters, including cropping at least some regions of the reconstructed picture to produce a second clipped picture different than the first clipped picture; and storing the second clipped picture in the buffer for use as a second reference picture. |
| D11 | The method of claim D10, wherein the first clipped picture and the second clipped picture are non-overlapping. |
| D12 | The method of claim D10. wherein the first clipped picture and the second clipped picture are overlapping. |
| D13 | The method of any one of claims D1-D12, wherein the buffer is a decoded picture buffer. |
| D14 | Tire method of any one of claims D1-D13, wherein the encoding the one or more pictures of the video sequence further comprises: comparing the reconstructed picture to one or more other pictures, the one or more other pictures having been previously reconstructed; identifying a new region in the reconstructed picture; and defining the clipping parameters to include the new region but exclude at least one other region of the reconstructed picture. |
| D15 | The method of any one of claims D1-D13, wherein the encoding the one or more pictures of the video sequence further comprises: measuring usage of the reconstructed picture as a reference picture in motion estimation for one or more other pictures; identifying a used region in the reconstructed picture; and defining the clipping parameters to include the used region but exclude at least one other region of the reconstructed picture. |
| D16 | The method of any one of claims D1-D13, wherein the encoding the one or more pictures of the video sequence further comprises: identifying regions of the reconstructed picture that were copied from another picture; defining the clipping parameters to exclude the copied regions but include at least one other region of the reconstructed picture. |
| D17 | A computer system comprising: a video encoder configured to perform video encoding operations of the method of any one of claims D1-D16; and a buffer configured to store the part of the bitstream. |
| D18 | One or more computer-readable media having stored therein computer-executable instructions for causing a computer system programmed thereby to |

| # | Feature |
|---|---|
| | perform video encoding operations as defined in the method of any one of claims D1-D16. |
| D19 | One or more computer-readable media having stored therein the encoded data produced by the method of any one of claims D1-D16. |
| | E. Decoding with Clipping of Reference Pictures. |
| E1 | In a computer system that implements a video decoder, a method comprising: receiving, as part of a bitstream, encoded data for one or more pictures of a video sequence: and decoding the encoded data to reconstruct the one or more pictures, including: reconstructing a given picture of the one or more pictures; clipping the reconstructed picture according to clipping parameters, including cropping at least some regions of the reconstructed picture to produce a clipped picture; storing the clipped picture in a buffer for use as a reference picture; and using the reference picture in motion compensation operations. |
| E2 | The method of claim E1, wherein the decoding further comprises one or more of: scaling the reconstructed picture before the clipping; and scaling the clipped picture. |
| E3 | The method of any one of claims E1-E2, wherein clipping information in the bitstream indicates the clipping parameters, and wherein the clipping information includes information indicating location of the clipped picture within the reconstructed picture. |
| E4 | The method of claim E3, wherein a scaling factor in the bitstream indicates one or more of: scaling the reconstructed picture before the clipping; and scaling the clipped picture. |
| E5 | The method of any one of claims E1-E2, wherein the decoding further comprises: determining the clipping parameters according to one or more rules. |
| E6 | The method of any one of claims E1-E5, wherein the decoding further comprises: determining a motion vector for a current block of a current picture, wherein the current block references the reference picture in at least one of the motion compensation operations; and adjusting a location referenced by the motion vector to compensate for the clipping. |
| E7 | The method of any one of claims E1-E6, wherein the decoding further comprises: assigning a reference picture index to the reference picture. |
| E8 | The method of claim E7, wherein information in the bitstream indicates the reference picture index. |
| E9 | The method of claim E7, wherein the reference picture index is assigned according to one or more rules. |
| E10 | The method of any one of claims E1-E9, wherein the clipping parameters are first clipping parameters, the clipped picture is a first clipped picture, and the reference picture is a first reference picture, and wherein the decoding further comprises: clipping the reconstructed picture according to second clipping parameters different than the first clipping parameters, including cropping at least some regions of the given picture to produce a second clipped picture different than the first clipped picture; and storing the second clipped picture in the buffer for use as a second reference picture. |
| E11 | The method of claim E10, wherein the first clipped picture and the second clipped picture are non-overlapping. |
| E12 | The method of claim E10, wherein the first clipped picture and the second clipped picture are overlapping. |
| E13 | The method of any one of claims E1-E12, wherein the buffer is a decoded picture buffer. |
| E14 | A computer system comprising: a video decoder configured to perform video decoding operations of the method of any one of claims E1-E13; and a buffer configured to store the part of the bitstream. |
| E15 | One or more computer-readable media having stored therein computer-executable instructions for causing a computer system programmed thereby to perform video decoding operations as defined in the method of any one of claims E1-E13. |
| | F. Bitstream of Video Encoded with Clipping of Reference Pictures. |
| F1 | One or more computer-readable media having stored therein encoded data for one or more pictures of a video sequence, wherein the encoded data is configured for decoding by a video decoder with video decoding operations that include: reconstructing a given picture of the one or more pictures; clipping the reconstructed picture according to clipping parameters, including |

| # | Feature |
|---|---|
| | cropping at least some regions of the reconstructed picture to produce a clipped picture; |
| | storing the clipped picture in a buffer for use as a reference picture; and |
| | using the reference picture in motion compensation operations. |
| | G. Encoding with Denoising of Reference Pictures. |
| G1 | In a computer system that implements a video encoder, a method comprising: encoding one or more pictures of a video sequence to produce encoded data, including: reconstructing a given picture of the one or more pictures: filtering the reconstructed picture, with a filter adapted to remove random noise, to produce a denoised picture; storing the denoised picture in a buffer for use as a reference picture; and using the reference picture in motion compensation operations: and outputting the encoded data as part of a bitstream. |
| G2 | The method of claim G1, wherein the encoding further comprises: filtering an input version of the given picture to produce a denoised input version of the given picture; and determining filter parameters for the filter based on results of comparing the denoised input version of the given picture to the reconstructed picture. |
| G3 | The method of claim G2, wherein the encoded data includes the filter parameters. |
| G4 | The method of claim G2, wherein the determining uses the denoised input version of the given picture as an optimization target for the reconstructed picture. |
| G5 | The method of any one of claims G1-G4, wherein the filter is selected from the group consisting of: a variation of frequency-domain lowpass filter; a variation of spatial/temporal-domain lowpass filter; a variation of spatial/temporal-domain median filter; and a filter that uses block-matching and three-dimensional filtering. |
| G6 | The method of any one of claims G1-G5, wherein the encoding further comprises: storing the reconstructed picture in the buffer for use as a reference picture. |
| G7 | A computer system comprising: a video encoder configured to perform video encoding operations of the method of any one of claims G1-G6; and a buffer configured to store the part of the bitstream. |
| G8 | One or more computer-readable media having stored therein computer-executable instructions for causing a computer system programmed thereby to perform video encoding operations as defined in the method of any one of claims G1-G6, |
| G9 | One or more computer-readable media having stored therein the encoded data produced by the method of any one of claims G1-G6. |
| | H. Decoding with Denoising of Reference Pictures. |
| H1 | in a computer system that implements a video encoder, a method comprising: receiving, as part of a bitstream, encoded data for one or more pictures of a video sequence; and decoding the encoded data to reconstruct the one or more pictures, including: reconstructing a given picture of the one or more pictures; filtering the reconstructed picture, with a filter adapted to remove random noise, to produce a denoised picture; storing the denoised picture in a buffer for use as a reference picture; and using the reference picture in motion compensation operations. |
| H2 | The method of claim H1, wherein the encoded data includes filter information that indicates filter parameters for the filter. |
| H3 | The method of any one of claims H1-H2, wherein the filter is selected from the group consisting of: a variation of frequency-domain lowpass filter; a variation of spatial/temporal-domain lowpass filter; a variation of spatial/temporal-domain median filter; and a filter that uses block-matching and three-dimensional filtering. |
| H4 | The method of any one of claims H1-H3, wherein the decoding further comprises: storing the reconstructed picture in the buffer for use as a reference picture. |
| H5 | A computer system comprising: a video decoder configured to perform video decoding operations of the method of any one of claims H1-H4; and a buffer configured to store the part of the bitstream. |
| H6 | One or more computer-readable media having stored therein computer-executable instructions for causing a computer system programmed thereby to perform video decoding operations as defined in the method of any one of claims 111-114. |

| # | Feature |
|---|---|
| | I. Bitstream of Video Encoded with Denoising of Reference Pictures. |
| I1 | One or more computer-readable media having stored therein encoded data for one or more pictures of a video sequence, wherein the encoded data is configured for decoding by a video decoder with video decoding operations that include:<br>reconstructing a given picture of the one or more pictures;<br>filtering the reconstructed picture, with a filter adapted to remove random noise, to produce a denoised picture;<br>storing the denoised picture in a buffer for use as a reference picture; and<br>using the reference picture in motion compensation operations. |
| I2 | The one or more computer-readable media of claim 11, wherein the encoded data includes filter parameters for the filter. |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system that implements a video decoder, a method comprising:
    receiving, as part of a bitstream, encoded data for one or more pictures of a video sequence, the encoded data including:
        encoded data for a global reference picture that is part of a global reference picture set; and
        encoded data for other pictures, the other pictures including at least one picture designated to be a random access picture; and
    decoding the encoded data to reconstruct the one or more pictures, including:
        decoding the global reference picture; and
        decoding the other pictures, wherein the global reference picture is available across one or more random access boundaries defined by the at least one picture designated to be a random access picture.

2. The method of claim 1, wherein the global reference picture is accessible to decode at least one of the other pictures before the designated random access picture in bitstream order and display order, and wherein the global reference picture is accessible to decode at least one of the other pictures after the designated random access picture in bitstream order and display order.

3. The method of claim 1, wherein, as part of the decoding the other pictures, the designated random access picture uses the global reference picture for reference in motion compensation operations.

4. The method of claim 3, wherein the global reference picture has a reference picture identifier, and wherein the motion compensation operations use the reference picture identifier to locate the global reference picture in a buffer.

5. The method of claim 1, wherein the encoded data for the one or more pictures of the video sequence further includes:
    one or more parameter sets that control the decoding the other pictures, wherein the one or more parameters sets are available across the one or more random access boundaries.

6. The method of claim 1, wherein the encoded data for the global reference picture is marked, with a unit type in the bitstream, as being part of the global reference picture set.

7. The method of claim 1, wherein the decoding the other pictures includes, for a given picture of the other pictures:
    constructing a current reference picture set that includes pictures available for reference in motion compensation operations for the given picture and any picture later than the given picture in coding order, the current reference picture set including the global reference picture; and
    constructing one or more reference picture lists from the current reference picture set.

8. The method of claim 1, wherein the decoding the encoded data to reconstruct the one or more pictures further includes removing a reference picture from a buffer and storing the global reference picture in the buffer, and wherein decoding of the designated random access picture does not cause removal of the global reference picture from the buffer.

9. The method of claim 1, wherein the decoding the other pictures includes:
    determining that the global reference picture is not available in a buffer; and
    skimming the bitstream to locate the encoded data for the global reference picture, or requesting re-transmission of the encoded data for the global reference picture.

10. A computer system comprising a buffer and a video decoder configured to perform video decoding operations comprising:
    receiving, as part of a bitstream, encoded data for one or more pictures of a video sequence; and
    decoding the encoded data to reconstruct the one or more pictures, including:
        reconstructing a given picture of the one or more pictures;
        clipping the reconstructed picture according to clipping parameters, including cropping at least some regions of the reconstructed picture to produce a clipped picture;
        storing the clipped picture in a buffer for use as a reference picture; and
        using the reference picture in motion compensation operations.

11. The computer system of claim 10, wherein the decoding further comprises one or more of:
    scaling the reconstructed picture before the clipping; and
    scaling the clipped picture.

12. The computer system of claim 10, wherein clipping information in the bitstream indicates the clipping parameters, and wherein the clipping information includes information indicating location of the clipped picture within the reconstructed picture.

13. The computer system of claim 10, wherein the decoding further comprises:
    determining the clipping parameters according to one or more rules.

14. The computer system of claim 10, wherein the decoding further comprises:
    determining a motion vector for a current block of a current picture, wherein the current block references the reference picture in at least one of the motion compensation operations; and
    adjusting a location referenced by the motion vector to compensate for the clipping.

15. The computer system of claim 10, wherein the decoding further comprises:
    assigning a reference picture index to the reference picture, wherein information in the bitstream indicates the reference picture index or the reference picture index is assigned according to one or more rules.

16. The computer system of claim 10, wherein the clipping parameters are first clipping parameters, the clipped picture is a first clipped picture, and the reference picture is a first reference picture, and wherein the decoding further comprises:
    clipping the reconstructed picture according to second clipping parameters different than the first clipping parameters, including cropping at least some regions of the given picture to produce a second clipped picture different than the first clipped picture; and
    storing the second clipped picture in the buffer for use as a second reference picture.

17. One or more computer-readable media having stored therein computer-executable instructions for causing a computer system programmed thereby to perform video decoding operations comprising:
    receiving, as part of a bitstream, encoded data for one or more pictures of a video sequence; and
    decoding the encoded data to reconstruct the one or more pictures, including:
        reconstructing a given picture of the one or more pictures;
        filtering the reconstructed picture, with a filter adapted to remove random noise, to produce a denoised picture;
        storing the denoised picture in a buffer for use as a reference picture; and
        using the reference picture in motion compensation operations.

18. The one or more computer-readable media of claim 17, wherein the encoded data includes filter information that indicates filter parameters for the filter.

19. The one or more computer-readable media of claim 17, wherein the filter is selected from the group consisting of:
    a variation of frequency-domain lowpass filter;
    a variation of spatial/temporal-domain lowpass filter;
    a variation of spatial/temporal-domain median filter; and
    a filter that uses block-matching and three-dimensional filtering.

20. The one or more computer-readable media of claim 17, wherein the decoding further comprises:
    storing the reconstructed picture in the buffer for use as a reference picture.

* * * * *